United States Patent
Wang et al.

(10) Patent No.: US 9,813,737 B2
(45) Date of Patent: Nov. 7, 2017

(54) TRANSPOSING A BLOCK OF TRANSFORM COEFFICIENTS, BASED UPON AN INTRA-PREDICTION MODE

(71) Applicant: BLACKBERRY LIMITED, Waterloo (CA)

(72) Inventors: Jing Wang, Waterloo (CA); Xiaofeng Wang, Markham (CA); Dake He, Waterloo (CA); Tianying Ji, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 669 days.

(21) Appl. No.: 14/031,436

(22) Filed: Sep. 19, 2013

(65) Prior Publication Data

US 2015/0078445 A1    Mar. 19, 2015

(51) Int. Cl.
| | |
|---|---|
| *H04N 19/61* | (2014.01) |
| *H04N 19/13* | (2014.01) |
| *H04N 19/157* | (2014.01) |
| *H04N 19/91* | (2014.01) |

(52) U.S. Cl.
CPC ............ *H04N 19/61* (2014.11); *H04N 19/13* (2014.11); *H04N 19/157* (2014.11); *H04N 19/91* (2014.11)

(58) Field of Classification Search
CPC ...... H04N 19/61; H04N 19/157; H04N 19/91; H04N 19/13
USPC ..................................................... 375/240.12
See application file for complete search history.

(56) References Cited

U.S. PATENT DOCUMENTS

| | | | | |
|---|---|---|---|---|
| 5,561,464 A | * | 10/1996 | Park | G06T 9/008 375/240.1 |
| 5,748,244 A | | 5/1998 | Jung | |
| 6,175,592 B1 | * | 1/2001 | Kim | G06T 3/4084 348/441 |
| 6,505,299 B1 | * | 1/2003 | Zeng | H04N 7/1675 348/E7.056 |
| 2005/0053151 A1 | | 3/2005 | Lin et al. | |
| 2005/0068208 A1 | | 3/2005 | Liang et al. | |
| 2012/0057630 A1 | * | 3/2012 | Saxena | H04N 19/105 375/240.03 |
| 2012/0140813 A1 | * | 6/2012 | Sole Rojals | H03M 7/4018 375/240.02 |

(Continued)

FOREIGN PATENT DOCUMENTS

| | | |
|---|---|---|
| CA | 2817360 | 6/2012 |
| WO | 2013006446 | 1/2013 |

OTHER PUBLICATIONS

TW Intellectual Property Office, Office Action relating to ROC (Taiwan) Patent Application No. 103132579 dated Oct. 8, 2015.

(Continued)

*Primary Examiner* — Jay Patel
*Assistant Examiner* — Marnie Matt
(74) *Attorney, Agent, or Firm* — Rowand LLP

(57) ABSTRACT

Methods and devices for video coding are described. If an intra-prediction mode to be used in encoding a block of residual data is in a specific predetermined class, e.g., the horizontal class, then at least a portion of a quantized transformed block of residual data is transposed during encoding. Likewise, if an intra-prediction mode that was used to generate an encoded block of residual data is in such a class, then at least a portion of an entropy-decoded block of residual data is transposed during decoding.

19 Claims, 33 Drawing Sheets

(56) References Cited

U.S. PATENT DOCUMENTS

| | | | |
|---|---|---|---|
| 2012/0140822 A1 | 6/2012 | Wang et al. | |
| 2012/0281768 A1 | 11/2012 | Matsuba et al. | |
| 2013/0003859 A1 | 1/2013 | Karczewicz et al. | |
| 2013/0064294 A1* | 3/2013 | Sole Rojals | H04N 19/176 375/240.12 |
| 2013/0094779 A1* | 4/2013 | Budagavi | G06T 5/002 382/260 |
| 2013/0114716 A1* | 5/2013 | Gao | H04N 19/593 375/240.14 |
| 2013/0128966 A1 | 5/2013 | Gao et al. | |
| 2013/0163664 A1* | 6/2013 | Guo | H04N 19/00793 375/240.12 |
| 2013/0182758 A1 | 7/2013 | Seregin et al. | |
| 2013/0188710 A1* | 7/2013 | Xu | H04N 19/159 375/240.13 |
| 2013/0195200 A1 | 8/2013 | Nguyen et al. | |
| 2013/0243083 A1* | 9/2013 | Sezer | H04N 19/60 375/240.02 |
| 2013/0272379 A1* | 10/2013 | Sole Rojals | H04N 19/176 375/240.02 |
| 2013/0343448 A1* | 12/2013 | He | H04N 19/176 375/240.03 |
| 2015/0016536 A1* | 1/2015 | Hsieh | H04N 19/61 375/240.18 |
| 2015/0078447 A1* | 3/2015 | Gamei | H04N 19/122 375/240.12 |

OTHER PUBLICATIONS

Zhichu, He et al: "Framework of AVS2-video coding", Published in: 2013 20th IEEE International Conference on Image Processing (ICIP), Date of Conference: Sep. 15-18, 2013, pp. 1515-1519 Sections 1, 2.1, 2.2, 3.1 and 3.2.

Liang, Fan et al: "Overview of AVS video standard", Published in Multimedia and Expo, 2004, ICME '04. 2004 IEEE International Conference, Date of Conference: Jun. 30-30, 2004, pp. 423-426 vol. 1 Section 3.2.

EPO, Extended European Search Report relating to Application No. 14185662.5, dated Feb. 4, 2015.

Sullivan et al.: "Overview of the High Efficiency Video Coding (HEVC) Standard", IEEE Transactions on Circuits and Systems for Video Technology, IEEE Service Center, NJ, US, Dec. 1, 2012, XP011487803.

Weerakkody et al.: "Mirroring of Coefficients for Transform Skipping", JCT-VC Meeting, JCTV-K0294, Oct. 3, 2012, XP030113176.

Sole et al.: "Transform Coefficient Coding in HEVC", IEEE Transactions on Circuits and Systems for Video Technology, vol. 22, No. 12, Dec. 2012.

Robert Cohen: "Modified coefficient scan order mapping for transform skip mode", JCTVC-J0313, Joint Collaborative Team on Video Coding (JCT-VC) of ITU-T SG 16 WP 3 and ISO/IEC JTC 1/SC 29/WG 1,110th Meeting: Stockholm, SE, Jul. 11-20, 2012.

Kim et al.: "Coefficient Scan for Transform Skip Mode", JCTVC-J0202, Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012.

He et al.: "Rotation of Residual Block for Transform Skipping", JCTVC-J0093, Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012.

Jicheng An et al.: "Residue scan for intra transform skip mode", JCTVC-J0053, Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012.

Ye et al.: "Improved H.264 Intra Coding Based on Bi-Directional Intra Prediction, Directional Transform, and Adaptive Coefficient Scanning", 2008.

* cited by examiner

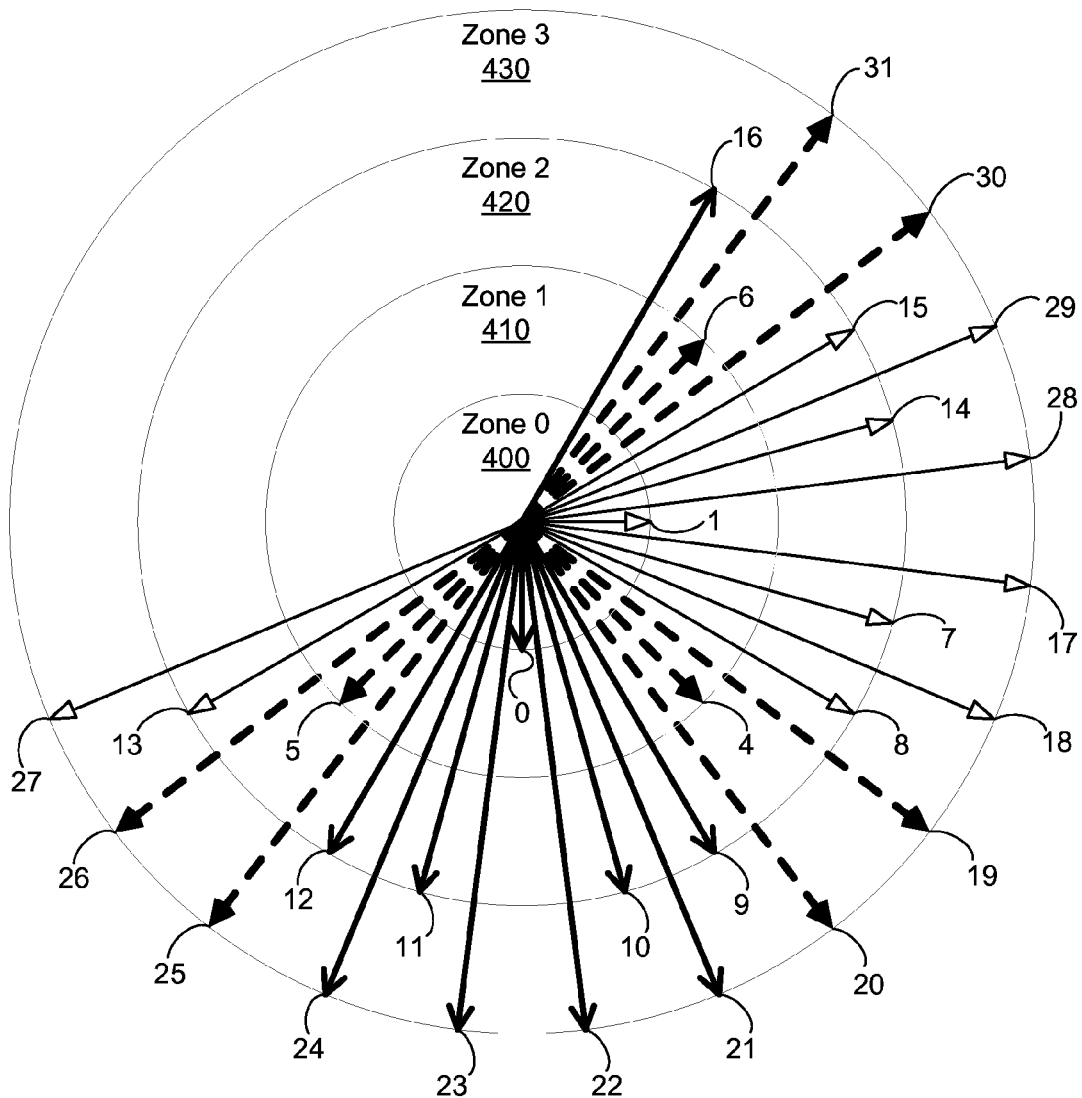
Vertical Class (210A) consists of: ⟶ modes
Horizontal Class (220A) consists of: ⟶▷ modes
Diagonal Class (230A) consists of: ⇢ modes plus DC (2), Plane (3), and Bilinear (32) modes
PRIOR ART  *Fig. 2a*  200A

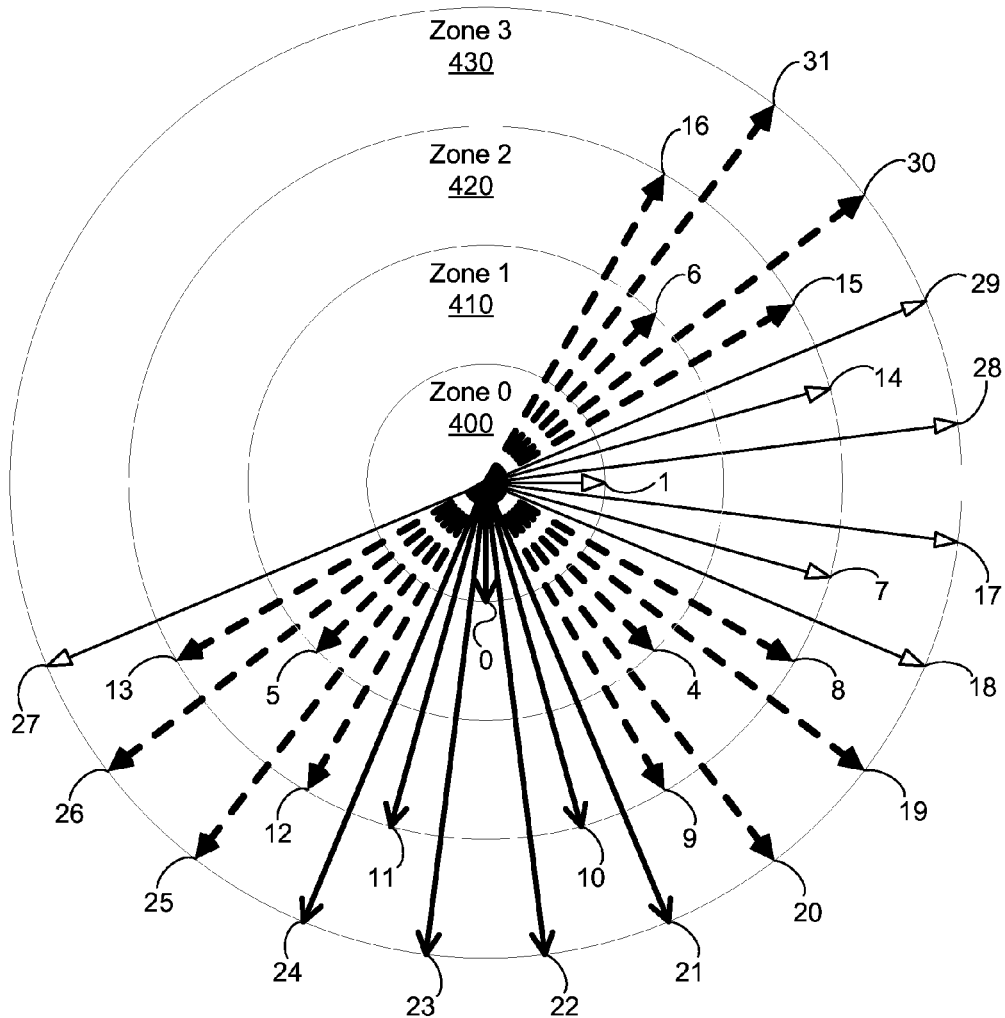

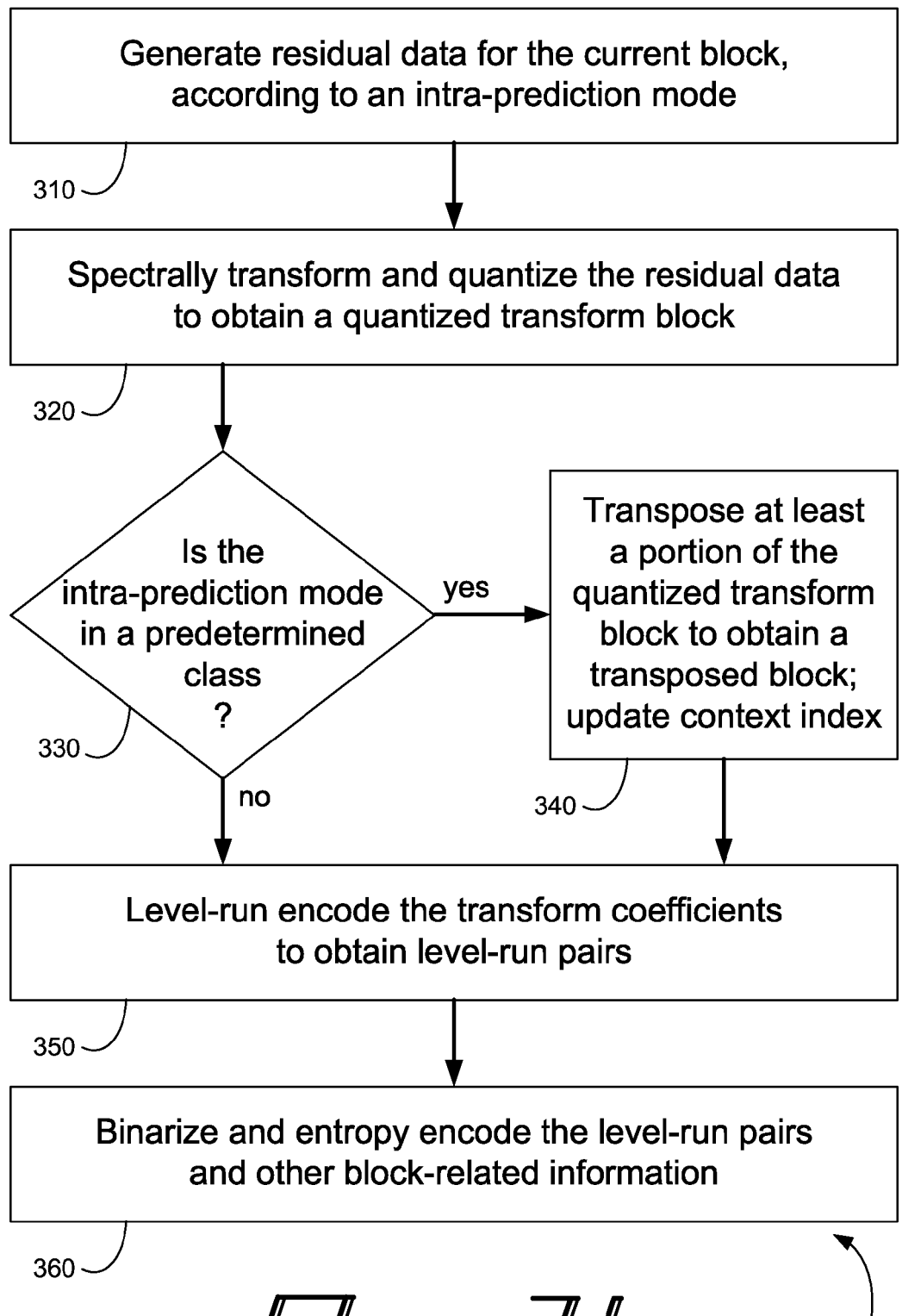

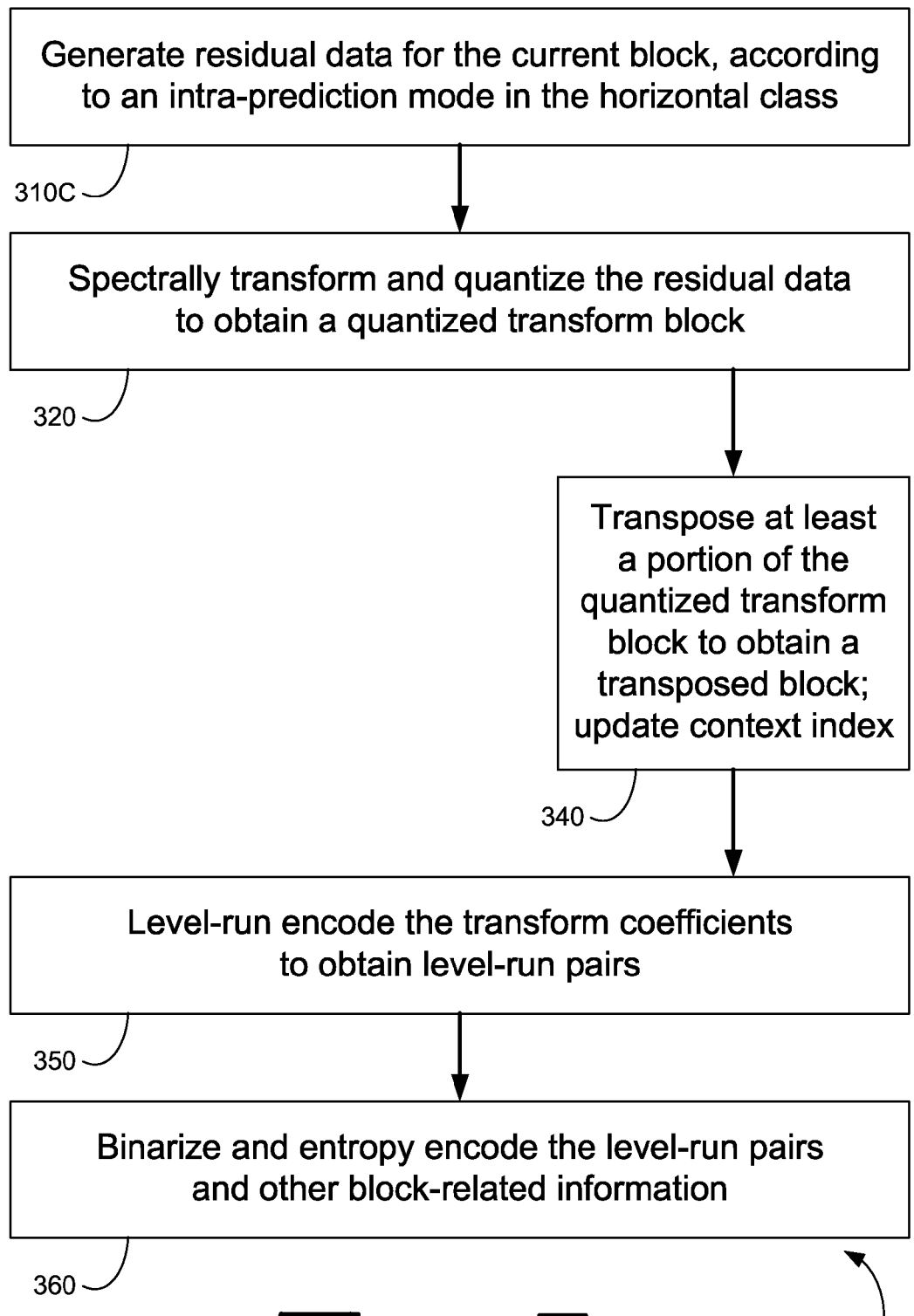

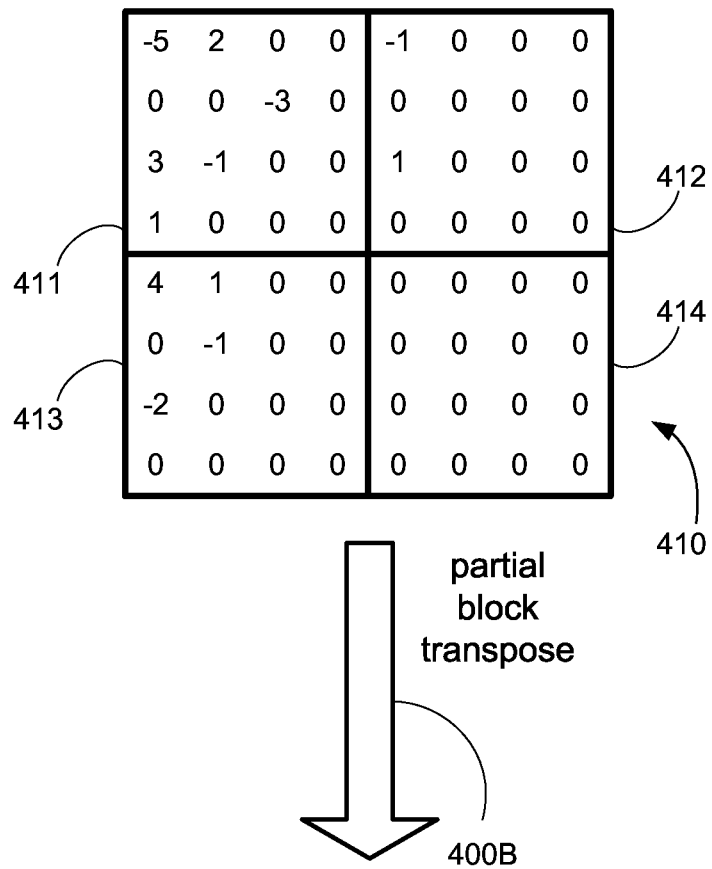
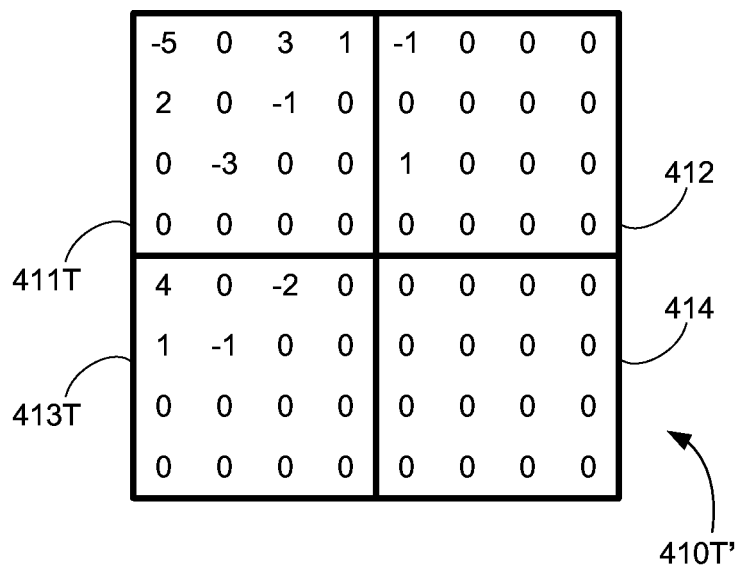
Fig. 4b

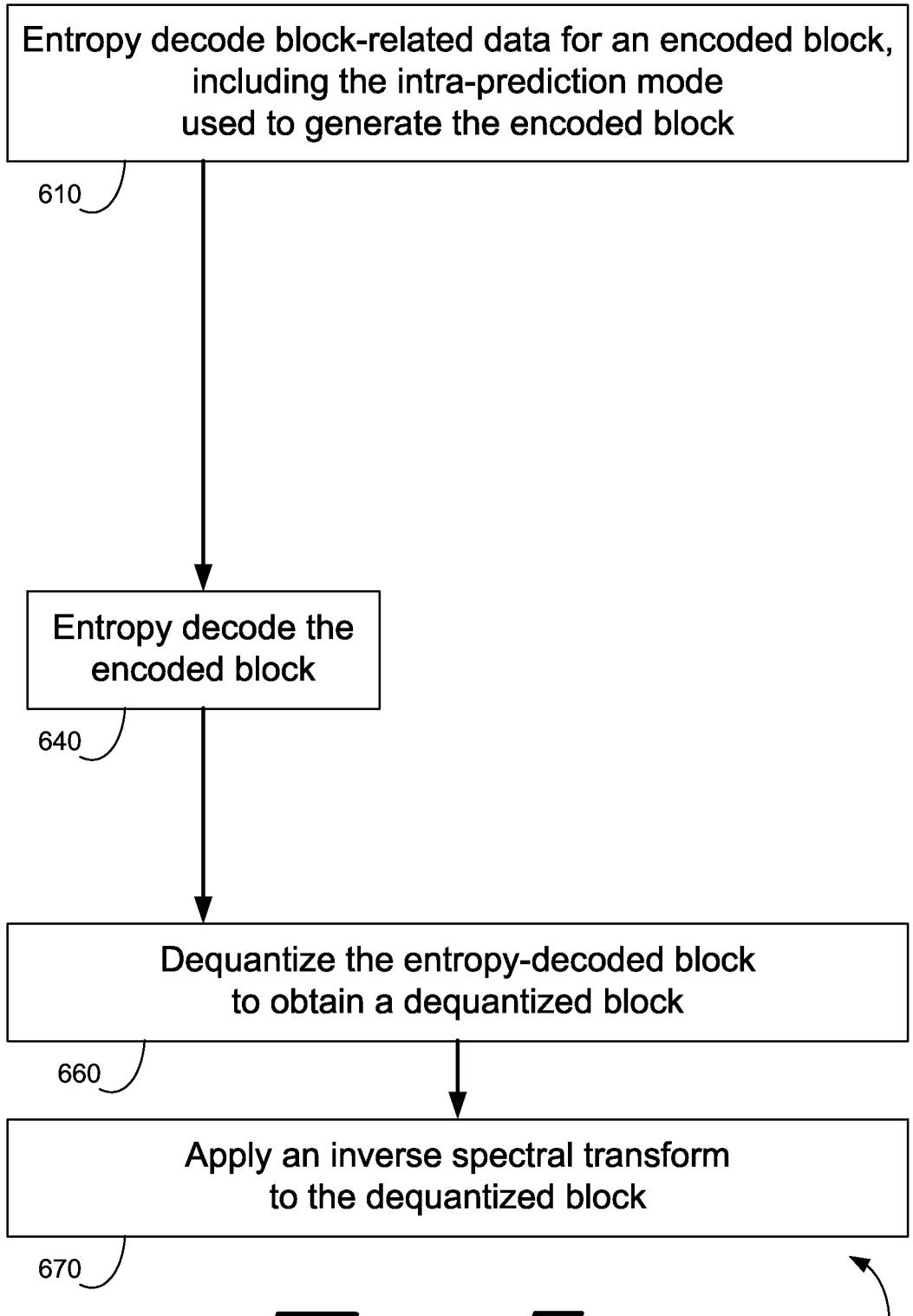

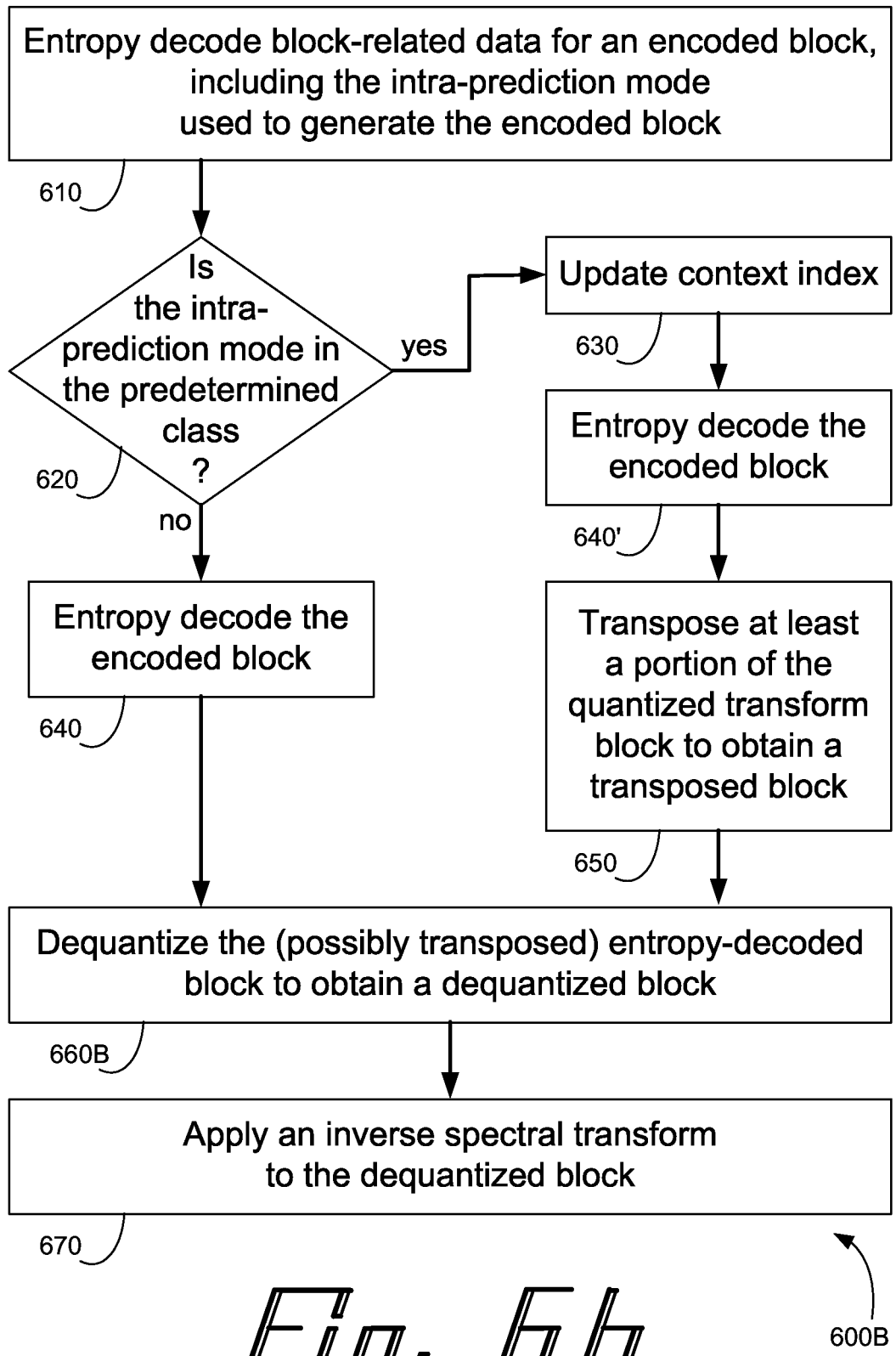

coefficient-group size =
4 coefficients x 4 coefficients

```
┌─────────────────────────────────────────────────┐
│ Determine that the mode to be used in generating the encoded
│ block is an intra-prediction mode in the horizontal class
└─────────────────────────────────────────────────┘
       364C
                          ↓
┌─────────────────────────────────────────────────┐
│ Entropy encode each bin of the level-run pairs for the
│ current CG, based upon a context derived at least in part
│ based upon to which region of the CG (partitioned into
│ horizontal strips, for intra-prediction modes in the vertical
│ class) the coefficient corresponding to that bin belongs:
```

362 — Is the coefficient corresponding to the bin the DC coefficient?

- yes → Use Context Model 0 (362A)
- no ↓

363 — Which region of CG is transposed coefficient in?

- Top Row → Use Context Model 1 (363A)
- Middle 2 Rows → Use Context Model 2 (363B)
- Bottom Row → Use Context Model 3 (363C)

360E' block size = 16 coefficients x 16 coefficients
= 4 coefficient groups x 4 coefficient groups

|   | CGx | | | |
|---|---|---|---|---|
|   | 0 | 1 | 2 | 3 |
| 0 | 1 | 1 | 1 | 0 |
| 1 | 1 | 0 | 1 | 1 (1000Cm) |
| 2 | 0 | 0 | 0 | n/a |
| 3 | 0 | 1 | n/a | n/a |

CGy ↓ block size = 16 coefficients x 16 coefficients
= 4 coefficient groups x 4 coefficient groups (lastCGX, lastCGY) = (3, 1)

1000F

Fig. 10b block size = 16 coefficients x 16 coefficients
= 4 coefficient groups x 4 coefficient groups coefficient-group size = 4 coefficients x 4 coefficients for 1000m, (lastPosX, lastPosY) = (1, 1)
for 1000k, (lastPosX, lastPosY) = (3, 2)

TRANSPOSING A BLOCK OF TRANSFORM COEFFICIENTS, BASED UPON AN INTRA-PREDICTION MODE

COPYRIGHT NOTICE

A portion of the disclosure of this document and accompanying materials contains material to which a claim for copyright is made. The copyright owner has no objection to the facsimile reproduction by anyone of the patent document or the patent disclosure, as it appears in the Patent and Trademark Office files or records, but reserves all other copyright rights whatsoever.

FIELD

The present disclosure relates generally to data compression and more particularly to improvements in methods and devices for encoding and decoding video.

BACKGROUND

Data compression occurs in a number of contexts. It is very commonly used in communications and computer networking to store, transmit, and reproduce information efficiently. It finds particular application in the encoding of images, audio and video. Video presents a significant challenge to data compression because of the large amount of data required for each video frame and the speed with which encoding and decoding often needs to occur.

The Audio and Video Coding Standard (AVS) Workgroup specifies audio coding, video coding, and transport protocols for use in China For the purpose of this document, AVS refers to the first version of the video coding specification defined by the AVS Workgroup, while AVS2 refers to the second version of the video coding specification currently under development by the AVS Workgroup. As used herein, the term "coding" encompasses both encoding and decoding.

Many video coding standards, including AVS and AVS2, use block-based coding processes. In these processes, the image or frame is divided into blocks, typically 4×4 or 8×8, although non-square blocks may be used in some cases, and the blocks are spectrally transformed into coefficients, quantized, and entropy encoded. In many cases, the data being transformed is not the actual pixel data, but is residual data following a prediction operation. Predictions can be intra-frame, i.e. block-to-block within the frame/image, or inter-frame, i.e. between frames (also called motion prediction).

To compress data, the coding of the quantized transform coefficients is designed to take advantage of characteristics of the transform to improve compression. In the case of AVS, the coefficients are coded using a sequence of quadruple: level, run, sign, end-of-block (EOB) flag. The coding is in a reverse zig-zag direction starting from the last non-zero coefficient in the zig-zag scan order in a transform block (hence the requirement for the EOB flag).

The level-minus-one and run data is binarized using unary binarization and the bins are then coded using context-based entropy coding. AVS specifically uses arithmetic coding for the transform coefficient data.

There are some limitations of the existing coding scheme for AVS. For example, straightforward extension of the existing AVS coding scheme to larger block sizes might not be efficient. Furthermore, side information like the intra prediction information is not used in coding the residual blocks after prediction.

BRIEF DESCRIPTION OF THE DRAWINGS

Reference will now be made, by way of example, to the accompanying drawings, which show sample embodiments of the present disclosure, and in which:

FIG. 2a depicts a known partition of intra-prediction modes into three disjoint classes;

FIG. 2b depicts a partition of intra-prediction modes into three disjoint classes, according to the present disclosure;

FIG. 3b shows a flowchart illustrating a method for encoding a block of residuals, incorporating a block transpose, according to the present disclosure;

FIG. 3c shows a flowchart illustrating a logic flow for one embodiment of the method depicted in FIG. 3b.

FIG. 4b depicts application of a partial block transpose to the same sample 8×8 block of quantized transform coefficients as in FIG. 4a;

FIG. 6a shows a flowchart illustrating a known method for decoding a block of residuals;

FIG. 6b shows a flowchart illustrating a method for decoding a block of residuals according to the present disclosure;

FIG. 9c shows a flowchart detailing—in the particular case of an intra-prediction mode in the horizontal class—the use of the partition selected according to the method depicted in FIG. 9b;

FIG. 10b shows a block of coefficient-group flags corresponding to the sample block depicted in FIG. 10a and illustrates the location of the last non-zero coefficient group in the group scan ordering of the coefficient groups within the block.

and in which like reference numerals are used in different figures to denote like features.

DESCRIPTION OF EXAMPLE EMBODIMENTS

Figure 1A:
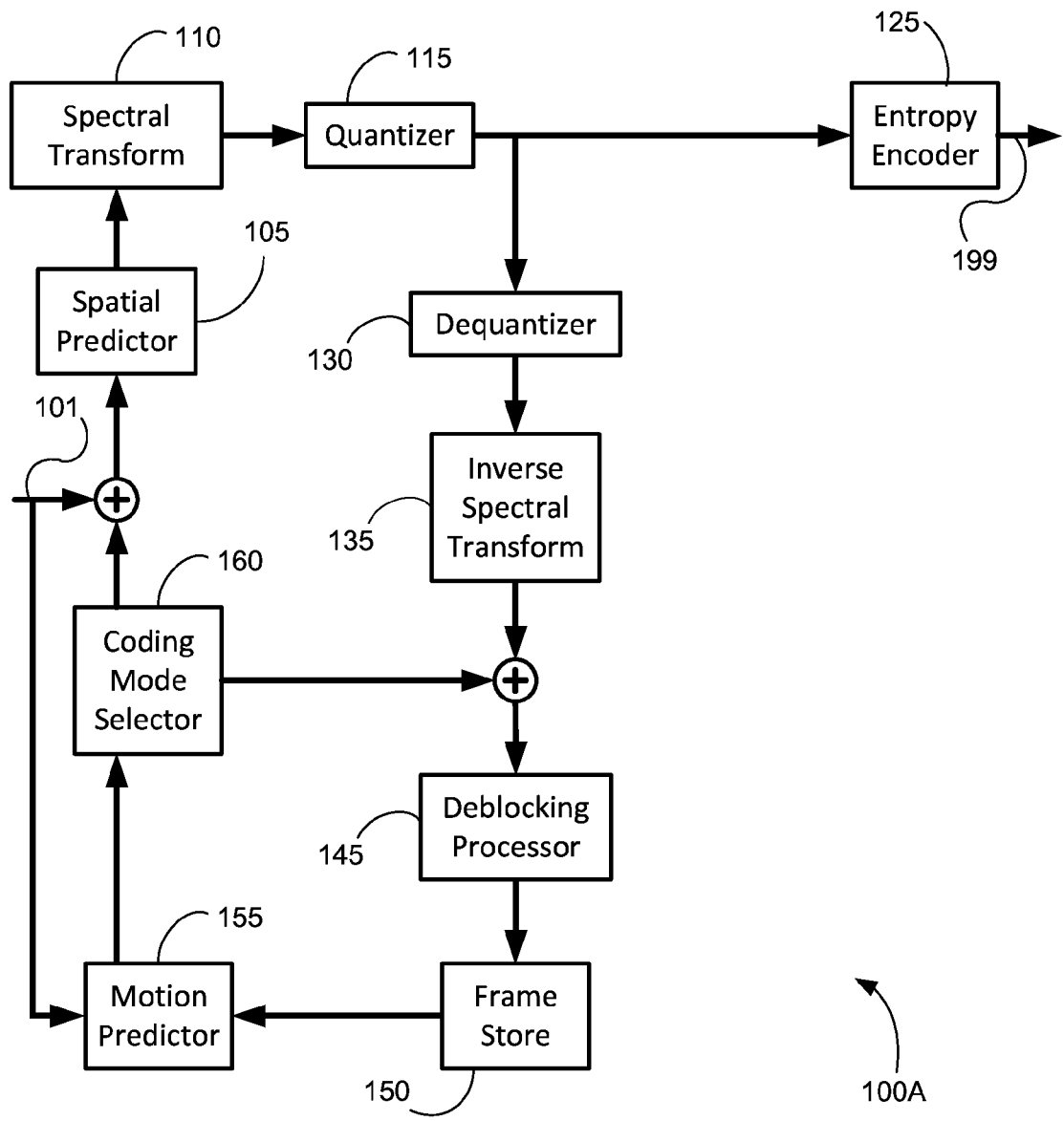
FIG. 1a shows, in block-diagram form, a known encoder for encoding video.

The present disclosure describes methods and encoders/decoders for encoding and decoding residual video data.

In a first aspect, the present disclosure describes a method for reconstructing a current block of residual data, using device 1500, from an encoded block of residual data in a bitstream of encoded video. The method comprises: (a) determining that a mode used in generating the encoded block is an intra-prediction mode in a predetermined class; (b) entropy decoding the encoded block to obtain an entropy-decoded block; and (c) responsive to determining that the mode is in the predetermined class, transposing at least a portion of the entropy-decoded block to obtain a transposed block.

In another aspect, the present disclosure discloses a method for encoding video using a video encoder, the video including a picture partitioned into blocks. The method comprises: (a) generating residual data for a current block, from spatial prediction of that block, using an intra-coding mode in a predetermined class; (b) spectrally transforming and quantizing the residual data to obtain a quantized transform block; (c) transposing at least a portion of the quantized transform block to obtain a transposed block; (d) level-run encoding the transform coefficients of the transposed block to obtain level-run pairs; and (e) binarizing and entropy encoding the level-run pairs, using a context model.

In a further aspect, the present disclosure describes encoders and decoders configured to implement such methods for encoding and decoding.

In yet a further aspect, the present disclosure describes non-transitory processor-readable media storing processor-executable program instructions which, when executed, configured a processor to perform the described methods for encoding and decoding.

Other aspects and features of the present disclosure will be understood by those of ordinary skill in the art from a review of the following description of sample embodiments in conjunction with the accompanying figures.

In the description that follows, some example embodiments are described with reference to the AVS standard for video coding and/or the developing AVS2 standard. Those ordinarily skilled in the art will understand that the present disclosure is not limited to AVS or AVS2, but may be applicable to other video encoding/decoding standards, including possible future standards, 3D and multi-view coding standards, scalable video coding standards, and reconfigurable video coding standards.

In the description that follows, when referring to video or images the terms frame, picture, slice, tile and rectangular slice group may be used somewhat interchangeably. Those of skill in the art will appreciate that, in the case of the AVS standard, a frame may contain one or more slices. Other terms may be used in other video coding standards. It will also be appreciated that certain encoding/decoding operations might be performed on a frame-by-frame basis, some are performed on a slice-by-slice basis, some picture-by-picture, some tile-by-tile, and some by rectangular slice group, depending on the particular requirements or terminology of the applicable image or video coding standard. In any particular embodiment, the applicable image or video coding standard may determine whether the operations described below are performed in connection with frames and/or slices and/or pictures and/or tiles and/or rectangular slice groups, as the case may be. Accordingly, those ordinarily skilled in the art will understand, in light of the present disclosure, whether particular operations or processes described herein and particular references to frames, slices, pictures, tiles, rectangular slice groups are applicable to frames, slices, pictures, tiles, rectangular slice groups, or some or all of those for a given embodiment. This also applies to transform units, coding units, groups of coding units, etc., as will become apparent in light of the description below.

In some scenarios, a frame can be divided in two areas, for instance one being used for screen content and the other for natural video. This may sometimes be called a split screen. Similarly, in a multiview codec, could utilize one view for screen content and the other for natural video. Alternatively, a bitstream could be composed of at least two substreams one making use of a transform skip or lossless mode, while the other would not. In any of these example situations, it will be understood that the coefficient reordering may be applied in the encoding/decoding of one of the views/areas/ streams that is using either the transform skip, the transform skip with flat quantization or a skip of the transform and quantization steps while the other area/view/stream may not have coefficient reordering applied to its encoding/decoding. The innovations described in the present disclosure can be employed with or without a transform skip. Moreover, the terms "transform coefficients" and "transform block" as used herein are intended to refer to coefficients and blocks thereof at a particular stage in encoding/decoding where coefficients and blocks thereof would reflect the application of a spectral transform if it had not been skipped. Thus the terms are meant to encompass situations where one special case of the spectral transform—the identity (i.e., do-nothing) function was applied instead of a standard spectral transform. This is because the innovations described herein do not depend on the application of a spectral transform.

In the case of scalable video coding, any of the embodiments disclosed hereinbelow may be applied to the base layer encoding/decoding, the enhancement layer encoding/decoding, or both layers. In the case of 3D or multi-view video coding, any of the forgoing embodiments may be applied to one of the view encoding/decoding, to the other view(s) encoding/decoding or to both/all views.

Figure 3A:
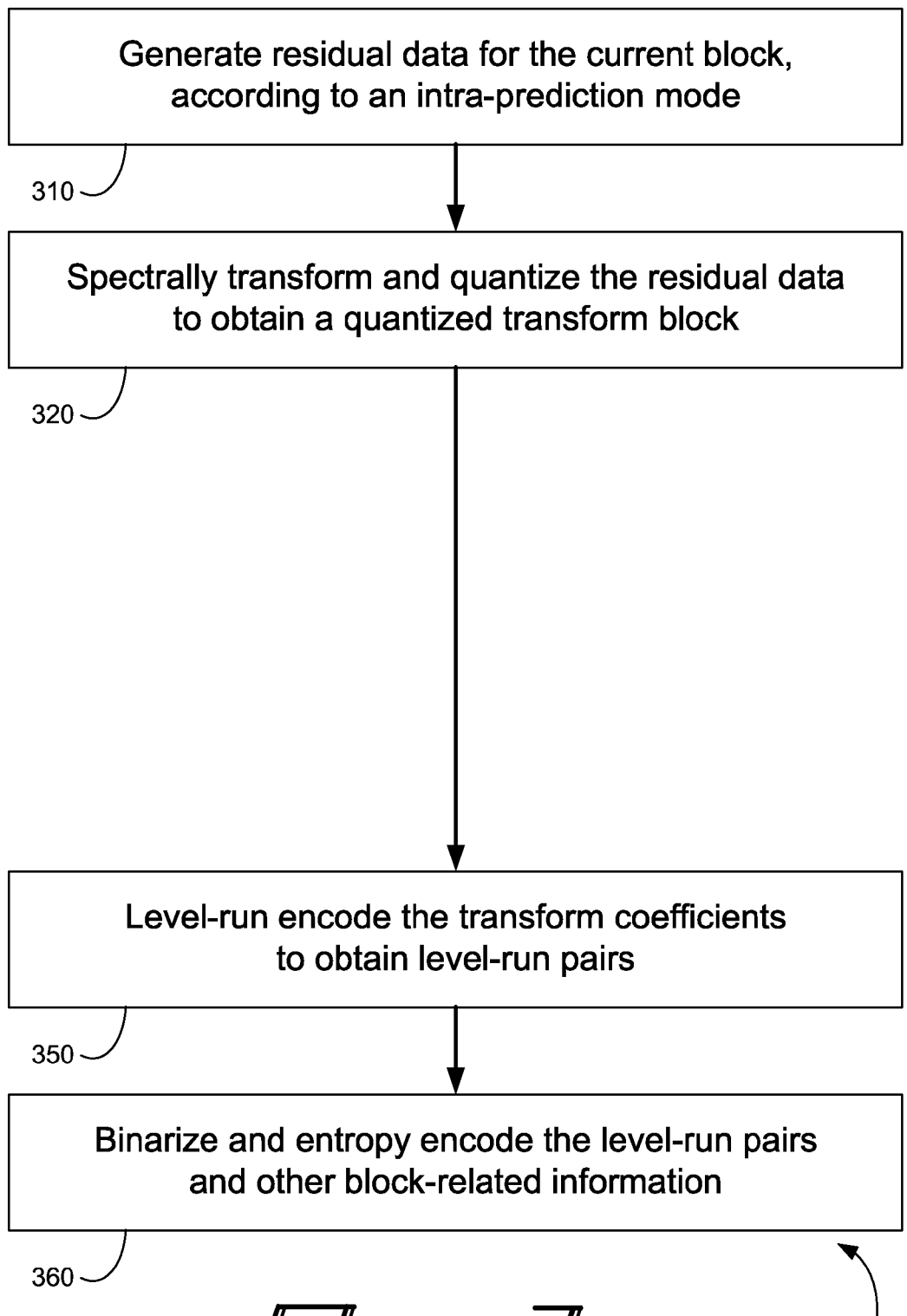
FIG. 3a shows a flowchart illustrating a known method for encoding a block of residuals.

Reference is first made to FIGS. 1a and 3a. FIG. 1a shows, in block-diagram form, conventional encoder 100A for encoding video. FIG. 3a shows a flowchart illustrating corresponding, conventional method 300A for encoding a block of residual data (to be explained shortly), which omits some preliminary encoding steps not involved in the innovations described herein.

Encoder 100A receives video source 101 and ultimately produces encoded bitstream 199. Encoder 100A may be configured to operate in conformance with a number of video compression standards. For example, the encoder 100A may be AVS- or AVS2-compliant; the latter is the standard of particular interest in the present disclosure, but the innovations described herein can be applied to other standards, as well.

Video source 101 comprises a sequence of frames, each corresponding to a different point in time. It processes one frame or slice at a time. Although but the bulk of the processing of one frame/slice is performed at a finer level of granularity; the frame/slice is partitioned into smaller blocks, and the processing in performed, in a loop, on a block-by-block basis. The blocks may be coding units, macroblocks, or sub-blocks.

As is well known in the art, a frame may be of type I, P, or B. Coding-mode selector 160 determines whether current frame being encoded is of type I, P, or B, and whether particular coding units (e.g. macroblocks, coding units, etc.) within the frame are to be inter or intra coded.

The two types of "inter-coded" frames—type-P and type-B—make use of temporal prediction, based on how the current frame differs from a previously processed frame corresponding to a different point in time. This type of prediction (which is not relevant to the present disclosure) makes use of a feedback loop in encoder 100A. The loop begins with dequantizer 130 and inverse spectral transform 135, which (like corresponding dequantizer 520 and inverse spectral transform 525 of conventional decoder 500A in FIG. 5A) approximately undo what spectral transform 110 and quantizer 115 (described below), i.e., they reconstruct residual data that is similar to the original residual data, but not identical to it (due to the lossy nature of step 320). Deblocking processor 145 (like corresponding deblocking processor 540 of decoder 500A) may perform filtering to remove artifacts at block boundaries and/or perform other smoothing as would be done during the decoding process. Frame store 150 thus stores a "reference" frame—reconstructed and deblocked as it would be by decoder 500A—for use by motion predictor 155.

A type-I frame—an "intra-coded" frame—is encoded without reference to other frames and therefore cannot employ temporal prediction. However, it does employ spatial prediction within the frame; in other words, part of the frame is encoded based on how it differs from another part of the frame.

Intra prediction—the type of prediction of concern in the present disclosure—is performed by spatial predictor 105 according to step 310 of FIG. 3a. Specifically, spatial predictor 105 compares data for the current block to the data for nearby pixels within blocks previously processed for the current frame and generates residual data for that block according to a prediction algorithm for particular a spatial-prediction mode. In the AVS and AVS2 standards, for example, there are 33 such modes, which will be discussed later in reference to FIGS. 2a and 2b. In some embodiments rate-distortion optimization may be used to select the best mode.

Then, at step 320 of FIG. 3a, spectral transform 110 spectrally transforms the residual data and quantizer 115 quantizes the output of the spectral transform. Although FIG. 1a depicts spectral transform 110 and quantizer 115 as distinct components of encoder 100A, as is understood in the art, these two operations can be performed either as two separate mathematical operations or as a single operation; thus, the two components shown can be replaced by a single component that accomplishes the same combined result. Moreover, in some embodiments, transform skipping may be employed; in such case, spectral transform 110 is not employed and step 320 merely quantizes residual data in the spatial domain.

The residual data that is input to spectral transform 110 is data in the spatial domain; this means the data corresponds (perhaps not in a one-to-one fashion) to pixels arranged in geometric rows and columns Spectral transform 110 converts this spatial-domain data into data in the transform domain; this output data—referred to herein as transform coefficients—contains frequency information about the pixels, from which the pixels can be reconstructed. In many embodiments, spectral transform 110 applies a discrete cosine transform (DCT). Although the AVS and AVS2 standards specify use of the DCT, the discrete sine transform or others transforms may be used in video coding protocols and are therefore anticipated as being within the scope of the present disclosure. Spectral transform 110 operates on a coding unit, macroblock or sub-block basis, depending on the size of the macroblocks or coding units. In the AVS and AVS2 standards, for example, a typical 16×16 macroblock contains four 8×8 transform blocks and the DCT process is performed on the 8×8 blocks. In some video coding protocols, the transform blocks may be 4×4, meaning that there are sixteen transform blocks per macroblock. In yet other cases, the transform blocks may be other sizes. In some cases, a 16×16 macroblock may include a combination of non-overlapping 4×4 and 8×8 transform blocks.

Continuing in reference to FIGS. 1a and 3a, entropy encoder 125 losslessly compresses symbols based on statistics as to the frequency of various symbols to be compressed; the symbols compressed includes not only data that is a direct reflection of the transformed quantized coefficients, but other data related to the current block, including indications of parameters relating to the block (such as the intra-prediction mode used in encoding the block) and/or flags that allow some zero-valued data to be "skipped" in the sense that multiple zero values are implied in the encoding process (and inferred in the decoding process), as will be explained later.

The data based directly on the transformed quantized coefficients also involves this kind of skipping of zero-valued data. In particular, at step 350 of FIG. 3*a*, the transformed quantized coefficients are level-run encoded due to the prevalence of zero-valued coefficients. This involves generating level-run ordered pairs, each consisting of (a) a magnitude of a non-zero coefficient followed by (b) the number of consecutive zero-valued coefficients following that non-zero coefficient in the reverse scan ordering.

At step 360, symbols representing both the transformed quantized coefficients and other data related to the current block are binarized and entropy encoded. Binarizing comprises converting symbols to some binary format, such as unary notation or some variant thereof. The AVS and AVS2 standards specify that entropy encoding be arithmetic coding, but in other video coding protocols, other types of entropy coding (such as variable-length coding) may be used (and, therefore, are within the scope of the present disclosure).

FIGS. 2*a* and 2*b* each depict thirty intra-prediction modes of one type—"angular"—and merely list three of another type—"non-angular"—used in video coding and also illustrate how all these modes are classified into three disjoint classes for use in novel method 300B of FIG. 3*b*. Each angular intra-prediction mode is depicted by an arrow representing the angle of spatial displacement, from the current block being coded, to the nearby pixels used in the intra prediction. The length of an arrow is inconsequential; rather, each arrow head is depicted as reaching a particular circle—and the corresponding mode is said to belong to a corresponding "zone"—to aid in depicting the angle of spatial displacement, measured from the positive y-axis, as being a multiple of some base angle. Modes 0 and 1—belonging to Zone 0, feature 400—have angles that are multiples of 90 degrees. Modes 4, 5, and 6—belonging to Zone 1, feature 410—have angles that are multiples of 45 degrees, but do not belong to Zone 0. Modes 7 through 16—belonging to Zone 2, feature 420—have angles that are multiples of 15 degrees, but do not belong to Zone 0 or 1. Modes 17 through 31—belonging to Zone 3, feature 430—have angles that are multiples of 7.5 degrees, but do not belong to Zone 0, 1, or 2. Non-angular intra-prediction modes—the DC mode (designated as mode 2 in the AVS2 standard), the plane mode (3), and the bilinear mode (32)—are merely listed in FIGS. 2*a* and 2*b*, because they embody no "direction" and therefore cannot be meaningfully depicted in terms of a vector; they are listed not just for the sake of completeness (in respect of the AVS2 standard), but because they are included in the classification scheme that will be explained next.

Improved Classification of Intra-Prediction Modes

What is important about FIGS. 2*a* and 2*b* is not the zones, but the depiction of classifications 200A and 200B, respectively. Each classification partitions the entire collection of intra-prediction modes 0 through 32 into three disjoint classes; determining that a given mode is not in either of two classes implies it must be in the remaining class. In classification 200A, depicted in FIG. 2*a*, vertical class 210A consists of modes 0, 9, 10, 11, 12, 16, 21, 22, 23, and 24, depicted by thick, solid arrows; horizontal class 220A consists of modes 1, 7, 8, 13, 14, 15, 17, 18, 27, 28, and 29, depicted by thin, solid arrows; and diagonal class 230A consists of the remaining modes, i.e., angular modes 4, 5, 6, 19, 20, 25, 26, 30, and 31, depicted by dashed arrows, together with non-angular modes 2, 3, and 32, which are merely listed in FIG. 2*a*. In classification 200B, depicted in FIG. 2*b*, vertical class 210B consists of modes 0, 10, 11, 21, 22, 23, and 24, depicted by thick, solid arrows; horizontal class 220B consists of modes 1, 7, 14, 17, 18, 27, 28, and 29, depicted by thin, solid arrows; and diagonal class 230B consists of the remaining modes, i.e., angular modes 4, 5, 6, 8, 9, 12, 13, 15, 16, 19, 20, 25, 26, 30, and 31, depicted by dashed arrows, together with non-angular modes 2, 3, and 32.

These classifications can be utilized to improve video coding in a number of ways. As previously disclosed in co-pending application PCT/CA2013/050020, these classes can be used for mode-dependent context design. When the intra-prediction mode used to encode a block is in a particular one of the classes, it tends to have a distinctive distribution of coefficients that corresponds to that class. When the determination of context, say for entropy coding of level-run pairs, is based upon the class to which the mode belongs, that determination will be more appropriate. When the determination is more appropriate, ultimately the coding will be more efficient. Classification 200A of FIG. 2*a* was previously disclosed as a way of distinguishing between these distinctive distributions.

It has now been realized that it is possible to partition the intra-prediction modes more effectively. Revised vertical class 210B and horizontal class 220B of classification 200B are "narrower" than corresponding classes 210A and 220A of classification 200A, i.e., the revised classes each comprise fewer modes, spanning smaller ranges of angles. Classes comprising fewer modes correspond to even more-distinctive distributions. However, the inventors have also realized that if a class is too small, there will not be enough data to train the context to reach a stable state, and the coding performance will be worse; this is known as the context dilution problem. Each of revised classes 210B and 220B strikes a balance between distribution distinctiveness and state stability. The net result is better coding performance with novel classification 200B than with previously disclosed classification 200A; this applies both to previously disclosed mode-dependent context design and to the additional coding improvement afforded by novel method 300B depicted in FIG. 3*b*, which will be described shortly.

Mode-Dependent Block Transpose of Coefficients

To explain this improvement in relation to the current state of the video-coding art, conventional method 300A of FIG. 3*a*, discussed earlier in relation to encoder 100A of FIG. 1*a*, is now reviewed. During the block-by-block encoding of a video, at step 310, residual data for the current block is generated according to an intra-prediction mode selected by coding-mode selector 160 (at a conventional step not shown as part of method 300A). At step 320, the block of residual data is spectrally transformed and quantized to obtain a quantized transform block. Although step 320 is depicted as a single step, it is known in the art that the net effect of spectrally transforming and quantizing can be achieved either by a single mathematical operation or by a sequence of two separate operations. In the AVS2 standard, the spectral transform employed is the discrete cosine transform (DCT), but other transforms—e.g., the discrete sine transform—may be used in video coding (and, therefore, are within the scope of the present disclosure). At step 350, the quantized transform coefficients are level-run encoded. This involves scanning the quantized transform coefficients in reverse zig-zag scanning order and generating pairs consisting of (a) a "level"—i.e., the magnitude of a non-zero coefficient—and (b) a "run"—i.e., the number of consecutive zero-valued coefficients following that non-zero coefficient (in the reverse zig-zag order) before the next non-zero coefficient or the extremity of the CG (if the last run counts the top-left coefficient of the CG). At step 360, the level-run pairs are binarized (for example, in unary code or some variant thereof) and entropy encoded. In the AVS2 standard, the entropy coding is arithmetic coding, but other types of entropy coding (such as variable-length coding) may be used in video coding (and, therefore, are within the scope of the present disclosure).

It has now been realized that after the intra prediction and transform processes in video compression, when the intra-prediction mode used is in the vertical class, non-zero transform coefficients tend to be located close to the top of the CGs. Similarly, when the intra-prediction mode used is in the horizontal class, non-zero transform coefficients tend to be located close to the left of the CGs. This observation suggests that a transform coefficient block after horizontal prediction, if transposed, would have similar statistics as a transform coefficient block after vertical prediction. (The statistics here mainly refer to a run—i.e., count—of zero-valued coefficients between consecutive non-zero coefficients in a CG and to the positions of the non-zero coefficients in the block, which determine positions of the last non-zero CG and of the last non-zero coefficient in a CG.). Since transposed horizontal-mode blocks have coefficient distributions similar to those of untransposed vertical-mode blocks, encoder 100B can be "tricked" into treating the former as if there were the latter, by programmatically commanding that they "share contexts" (as detailed below). This has the effect of reducing the total number of contexts. Reducing the number of contexts that need to be stored in turn reduces the entropy coding complexity.

Figure 1B:
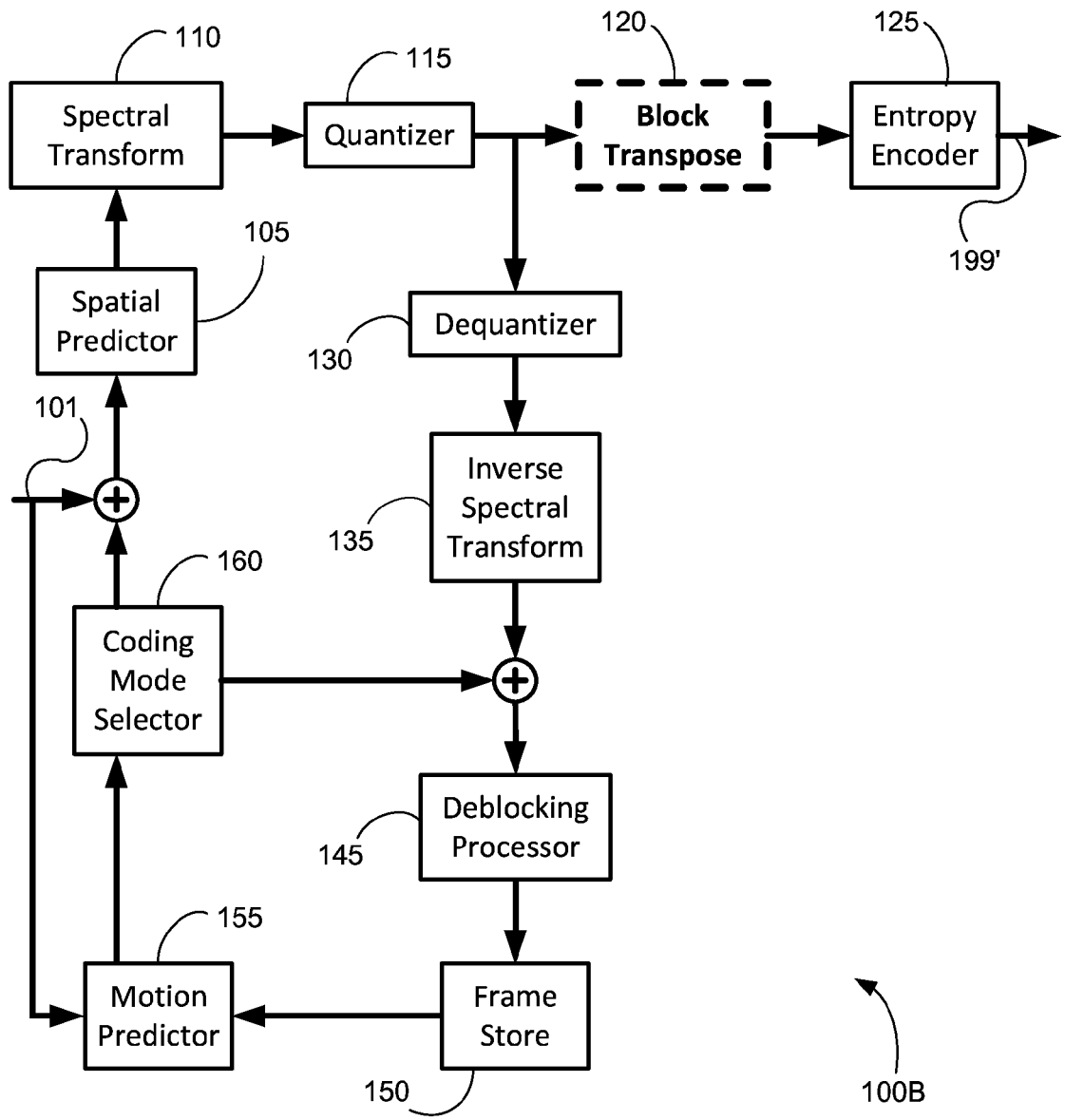
FIG. 1b shows, in block-diagram form, an encoder for encoding video, according to the present disclosure.

A technical application of this observation is shown in FIGS. 1b and 3b. FIG. 1b shows, in block-diagram form, encoder 100B, which differs from encoder 100A of FIG. 1a in that block transpose 120 is interposed between quantizer 115 and entropy encoder 125. It is shown in dashed outline to indicate that, although its position is fixed, it need not be employed in all circumstances. In fact, the point of transposing a transform coefficient block is to transpose for intra-prediction modes in a first particular class (e.g., the horizontal class) and not to transpose for intra-prediction modes in second particular class (e.g., the vertical class), so that a transform coefficient block after intra-prediction via a mode in the first class, once transposed, would have similar statistics as a transform coefficient block after intra-prediction via a mode in the second class. Thus, in practice, a test (not shown in FIG. 1b, but indicated at step 330 of FIG. 3b, described next) is performed to determine whether the functionality of block transpose 120 should be invoked.

Figure 4A:
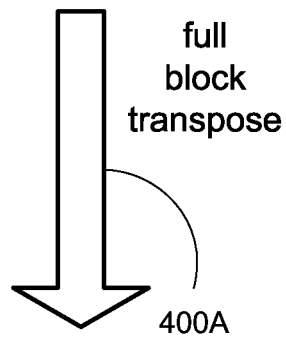
FIG. 4a depicts application of a full block transpose to a sample 8×8 block of quantized transform coefficients.

FIG. 3b shows a flowchart illustrating novel method 300B for encoding a block of residuals as detailed hereinbelow. It is distinguished from conventional method 300A, depicted in FIG. 3a, by the addition of steps 330 and 340. At step 330, a test is performed to determine whether the intra-prediction mode to be used by spatial predictor 105 (as determined by coding mode selector 160) is in a predetermined class. For greater clarity, this test does not merely determine whether the mode is in some predetermined class; such a test would be unnecessary, because every mode is in exactly one of the three classes, which are each "predetermined" according to the inter-operability requirements of an agreed-upon encoding-decoding standard (which may be written so as to specify only a decoding protocol, with the encoding protocol being implicit). The test determines whether the mode is in a specific class predetermined that is the sole class for which the quantized transform block is transposed. As is explained below, the horizontal class is the best choice to be this specific, distinguished predetermined class. At step 340, at least a portion of the quantized transform block is transposed as illustrated in FIGS. 4a (for a full block transpose) and 4b (for a partial block transpose) if the specific predetermined class. To complete the deception—"tricking" encoder 100B into treating a transposed block of one mode class as if it were an untransposed block of another class—a context index should be updated; otherwise, the decoding would be less efficient than if context were derived according to an updated context index, and the full advantages of the block transform would not be realized.

For example, suppose that, for some embodiment, the specific predetermined class that triggers a block transpose is the horizontal class. Suppose further that encoder 100B ordinarily interprets the context index intraModeIdx having the value INTRA_PRED_VER, INTRA_PRED_HOR, or INTRA_PRED_DC_DIAG (constants equated with, for example, 0, 1, and 2, respectively) as indicating that the mode used for intra prediction—and, therefore, for mode-dependent entropy encoding—is in the vertical, horizontal, or diagonal class, respectively. Then pseudo-code representing the updating of the context index would be:

If intraModeIdx=INTRA_PRED_HOR,
intraModeIdx=INTRA_PRED_VER

Although there are three classes that could potentially be predetermined as the class of modes for which a block transpose is performed at step 340, one class is the least desirable class and another is the most desirable. The predetermined class should not be the diagonal class, because, for modes in the diagonal class, the non-zero coefficients are distinctively distributed along one edge (as is the case for the modes in the other two classes). It has been now realized that the horizontal class has an advantage over the vertical class as the predetermined class, because of the particular zig-zag scan ordering of coefficients within a CG and of CGs within a block, as will be explained in reference to scan ordering 1020 of FIG. 10c.

FIG. 3c shows a flowchart illustrating logic flow 300C through method 300B depicted in FIG. 3b, in one embodiment in which the predetermined class is the horizontal class. In particular, step 310 of FIG. 3b is particularized to replacement step 310C for the case in which the intra-coding mode is in the horizontal class. Test 330 of method 300B is not shown in logic flow 300C, and the block transpose at step 340 is therefore performed unconditionally.

Reference is now made to FIGS. 4a and 4b. FIG. 4a depicts the application of full block transpose 400A to sample 8×8 block 410 of quantized transform coefficients to produce transposed block 410T; the transpose is the conventional matrix transpose, i.e., a flip about the diagonal that runs from the top-left corner to the bottom-right corner of the block. If the initial block (e.g., block 410) is denoted by B[j,i], where j=0 . . . BlockHeight−1 and i=0 . . . BlockWidth−1 and, and the transposed block (e.g., block 410T) is denoted by $B^T$[j,i], for j=0 . . . BlockHeight−1 and i=0 . . . BlockWidth−1, then the full block transpose can be formulated as:

$$B^T[j,i]=B[i,j], \text{ for } j=0 \ldots \text{BlockHeight}-1 \text{ and } i=0 \ldots \text{BlockWidth}-1.$$

FIG. 4b, on the other hand, depicts application of partial block transpose 400B to the same sample 8×8 block 410 as in FIG. 4a. In this case, 4×4 coefficient blocks 411 and 413 along the left edge of block 410 are individually transposed to produce transposed coefficient blocks 411T and 413T, while coefficient blocks 412 and 414; the net result is partially transposed block 410T'. In another embodiment (not depicted), 411 and 412 along the top edge of block 410 can be individually transposed. These two embodiments are mere samples of the various partial transposes that are within the scope of the present disclosure. For each such partial block transpose, the formulation is a restriction and/or adaptation of the above formula for the full block transpose.

Figure 5A:
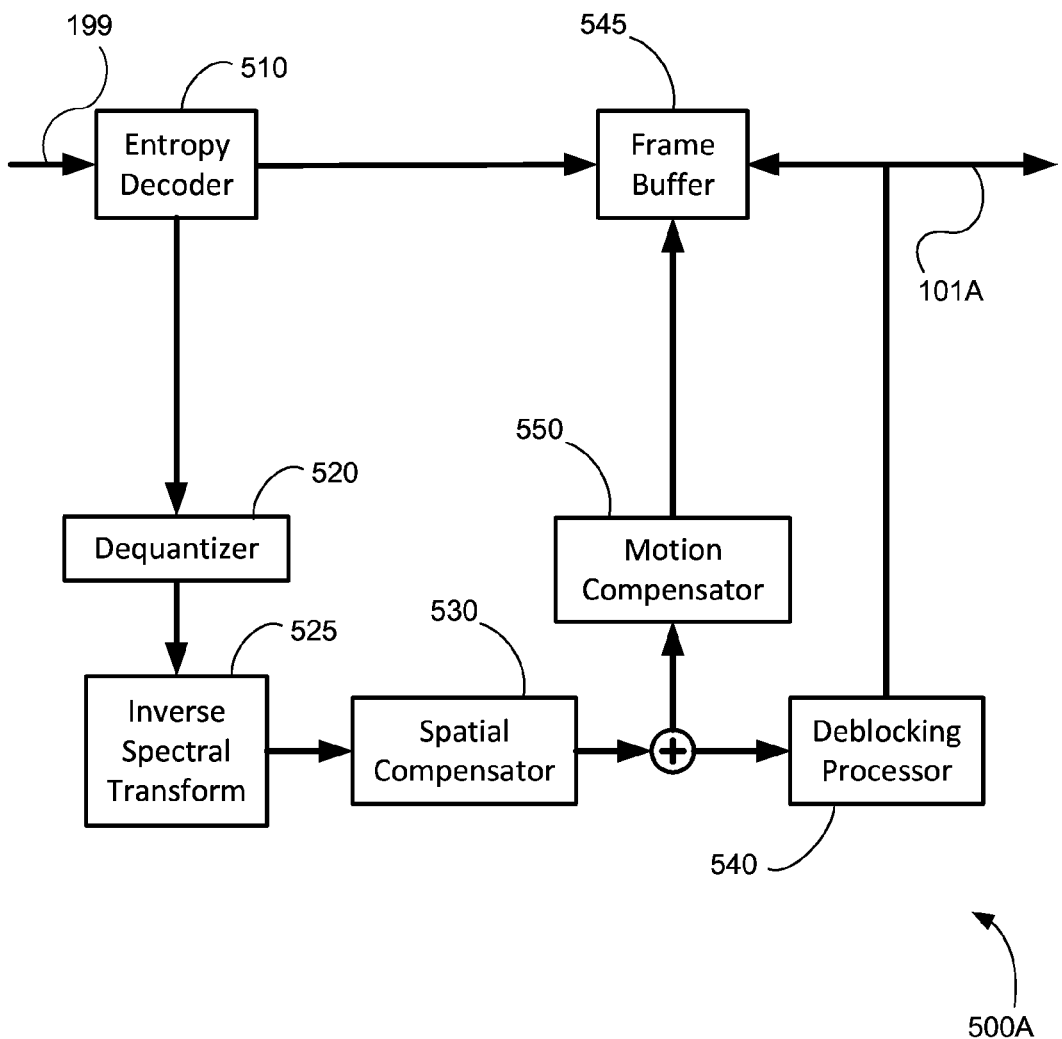
FIG. 5a shows, in block-diagram form, a known decoder for decoding video.

Reference is now made to FIGS. 5*a* and 6*a*. FIG. 5*a* shows, in block-diagram form, conventional decoder 500A that is compatible with conventional encoder 100A, i.e., that is capable of decoding video generated by said encoder. FIG. 6*a* shows a flowchart illustrating corresponding, conventional method 600A for decoding a block of residuals for an intra-coded frame.

Decoder 500A receives compatible bitstream 199 encoded by, for instance, encoder 100A of FIG. 1*a*. (It is well known in the art that functionally different encoders may produce encoded bitstreams that can nevertheless be decoded by a single decoder.) Decoder 500A ultimately produces reconstructed video 101A, which, due to the lossy encoding process, is an imperfect but adequate replica of original video source 101 that was input to an encoder. Decoder 500A may be configured to operate in conformance with a number of video compression standards. For example, decoder 500A may be AVS- or AVS2-compliant.

At step 610, entropy decoder 510 (corresponding to and undoing the action of entropy encoder 125 of encoder 100A) entropy decodes data related to that block, including the intra-prediction mode (from amongst the thirty-three intra-prediction modes depicted or listed in FIGS. 2*a* and 2*b*) used to generate the encoded block. Decoder 500A does not include a component corresponding to coding-mode selector 160 of encoder 100A, which has the task of determining which coding mode has to be used (based on various criteria). Rather, data previously decoded includes an indication of whether the current frame being encoded is of type I, P, or B, and whether particular coding units within the frame are to be inter or intra coded. At step 640, entropy decoder also entropy decodes the encoded block to produce an entropy-decoded block of residual data.

At step 660, the entropy-decoded block of quantized transform coefficients is dequantized by dequantizer 520 to un-do the quantization performed as part of step 320 (of FIG. 3*a*) by quantizer 115 in encoder 100A (of FIG. 1*a*). This produces a dequantized block of residual data. At step 670, inverse spectral transform 525 operates on the dequantized block of residual data to un-do what spectral transform 110 of encoder 100A did during the remainder of step 320.

The operations of certain components of decoder 500A comprise conventional steps not shown as part of method 600A. Spatial compensator 530 applies the intra-prediction mode recovered from the bitstream as mentioned above. Motion compensation is performed for I-type and B-type frames by motion compensator 550. Deblocking processor 540 may perform filtering to remove artifacts block boundaries and/or perform other smoothing (just as corresponding deblocking processor 145 of decoder 500A anticipated during the encoding process). Frame buffer 545 stores data for subsequent intra and inter prediction.

Figure 5B:
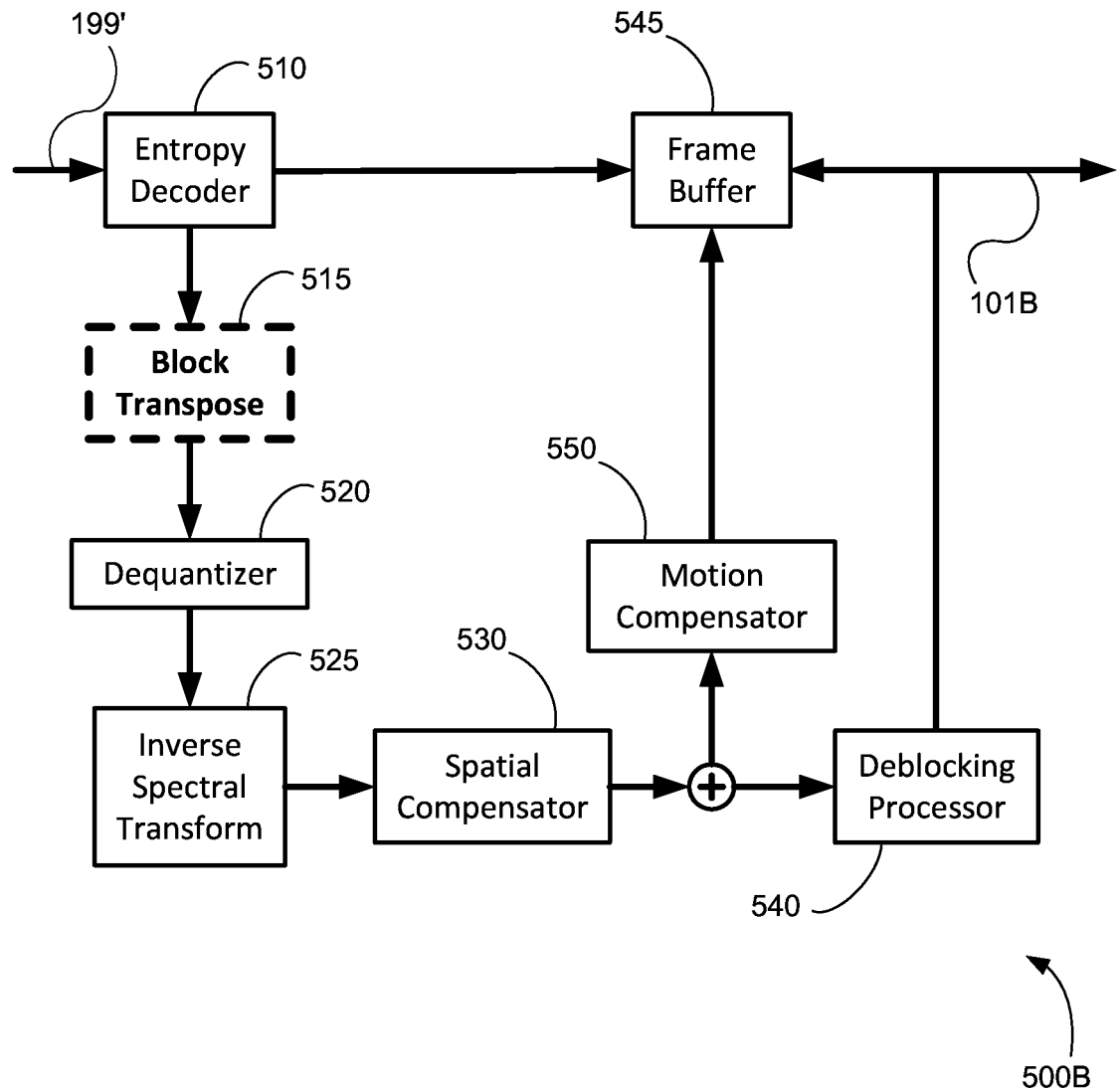
FIG. 5b shows, in block-diagram form, an decoder for decoding video, incorporating a block transpose, according to the present disclosure.

Reference is now made to FIGS. 5*b* and 6*b*. FIG. 5*b* shows, in block-diagram form, novel decoder 500B for decoding video encoded by encoder 100B depicted in FIG. 1*b*. FIG. 6*b* shows a flowchart illustrating a method for decoding a block of residuals encoded according to method 300B depicted in FIG. 3*b*. Since novel encoder 100B includes block transpose 120, novel decoder 500B must contain a component, suitably positioned in the sequence of encoding components, to un-do the effect of the block transpose by applying the inverse of the block transpose; otherwise, spatial-domain data would ultimately be reconstructed from garbled transform-domain data, because transform coefficients would be associated with the wrong frequencies. Of course, block transpose 120 performs a period-two operation, meaning that applying it twice amounts to applying the identity (i.e., do-nothing) operation. Said another way, block transpose 120 is its own inverse. Thus, novel decoder 500B differs from conventional decoder 500A in that block transpose 515—which not only is the inverse of block transpose 120, but is also identical to it—is interposed between entropy decoder 510 and dequantizer 520. Furthermore, to be compatible, precisely the same type block transpose—full or partial—must be incorporated in both the encoder and the decoder. Block transpose 515 is depicted in dashed outline because it is only employed if the intra-prediction mode used to generate the encoded block is in the specific predetermined class that triggers operation of block transpose 120 of encoder 100A during encoding.

Similarly, novel decoding method 600B differs from conventional method 600A in that, to be compatible with novel encoding method 300B, it must contain step 650, at which a block transpose (which is also the inverse of the block transpose applied during encoding) is applied to the quantized transform block; moreover, to be compatible, precisely the same type of transpose applied—full or partial—must be applied during both the encoding and decoding.

However, step 650 is only executed on condition that, at step 620, the determination of whether the intra-prediction mode used during encoding of the current block is in a pre-determined class has an affirmative outcome. This is because it only makes sense (a) to transpose for modes in the horizontal class, so that coefficients will be distributed similarly to those for modes in the vertical class, or (b) to transpose for modes in the vertical class, so that coefficients will be distributed similarly to those for modes in the horizontal class. (In practice, option (a) is preferred, as is explained elsewhere herein.) If the test of the intra-prediction mode at step 620 has a negative outcome, then the encoded block is merely entropy decoded at step 640, just as in method 600A of FIG. 6*a*. On the other hand, if that test has an affirmative outcome, then the entropy decoding of the encoded block at step 640' (prior to block-transposing step 650) should follow an updating of the context index at step 630; otherwise, more contexts will be used and the entropy coding will be more complex than if context is derived according to an updated context index. The updating is preformed exactly as it is during encoding. For example, suppose that, for some embodiment, the specific predetermined class that triggered a block transpose during encoding was the horizontal class. Suppose further that encoder 100B ordinarily interprets the context index intraModeIdx having the value INTRA_PRED_VER, INTRA_PRED_HOR, or INTRA_PRED_DC_DIAG (constants equated with, for example, 0, 1, and 2, respectively) as indicating that the mode used for intra prediction—and, therefore, for mode-dependent entropy encoding—is in the vertical, horizontal, or diagonal class, respectively. Then pseudo-code representing the updating of the context index would be:

If intraModeIdx=INTRA_PRED_HOR,
intraModeIdx=INTRA_PRED_VER

Dequantizing step 660B functions no differently than step 660 of method 600A. The different feature number merely reflects that it has a more varied input, which might or might not have been transposed at step 650.

Figure 6C:
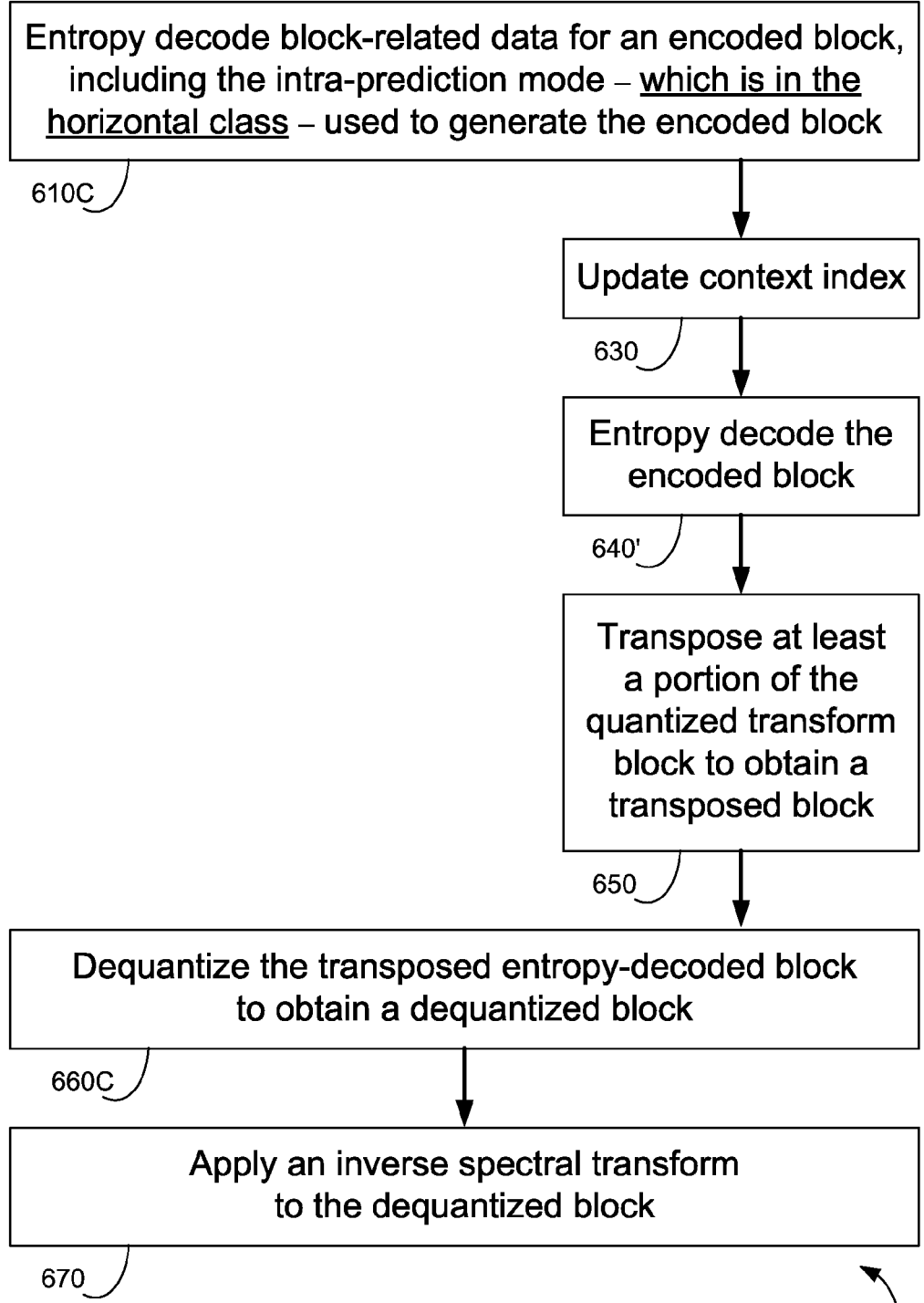
FIG. 6c shows a flowchart illustrating a logic flow for one embodiment of the method depicted in FIG. 6b.

FIG. 6c shows a flowchart illustrating logic flow 600C in one embodiment of method 600B depicted in FIG. 6b. That embodiment is restricted to the case when the specified predetermined class (which triggers the application of a transpose) is the horizontal class and the intra-prediction mode used to generate the encoded block is in that class. This logic sequence begins with step 610C, which functions the same at step 610 of method 600B; the changed feature number reflects that the outcome is a decoded intra-prediction mode that is in the horizontal class. That being the outcome, the context index is unconditionally updated (and test 620 is not shown), for example, in accordance with the pseudo-code above. Steps 640' and 650 follow, as in method 600B. Dequantizing step 660C functions no differently than step 660B of method 600B. The different feature number merely reflects that the input, by virtue of this logic path, necessarily was transposed at step 650.

Improved Mode-Dependent Context Design for Level-Run Coding

In co-pending application PCT/CA2013/050020, it was disclosed that coding efficiency benefits if context for entropy coding of level-run pairs is derived at least in part upon the locations of transform coefficients within the current coefficient group and class to which the intra-prediction mode belongs. To that end, for each of the three classes of the intra-prediction modes (defined, in that application, in reference to classification 200A of FIG. 2a), a corresponding bipartite partition of the coefficient positions within the CG was disclosed. Context for entropy coding each bin of level-run pairs—for a particular mode class—was then derived based on which of two regions—of the partition for that class—the coefficient corresponding to that bin lies within. It has now been realized that further improvements in coding efficiency can be achieved by means of tripartite partitions, described next. In light of what has been disclosed hereinabove, application of partitions should also be adapted to the presence of any transpose operation; otherwise, mode-dependent context design would not be as efficient as if adaptation were made.

Figure 7:
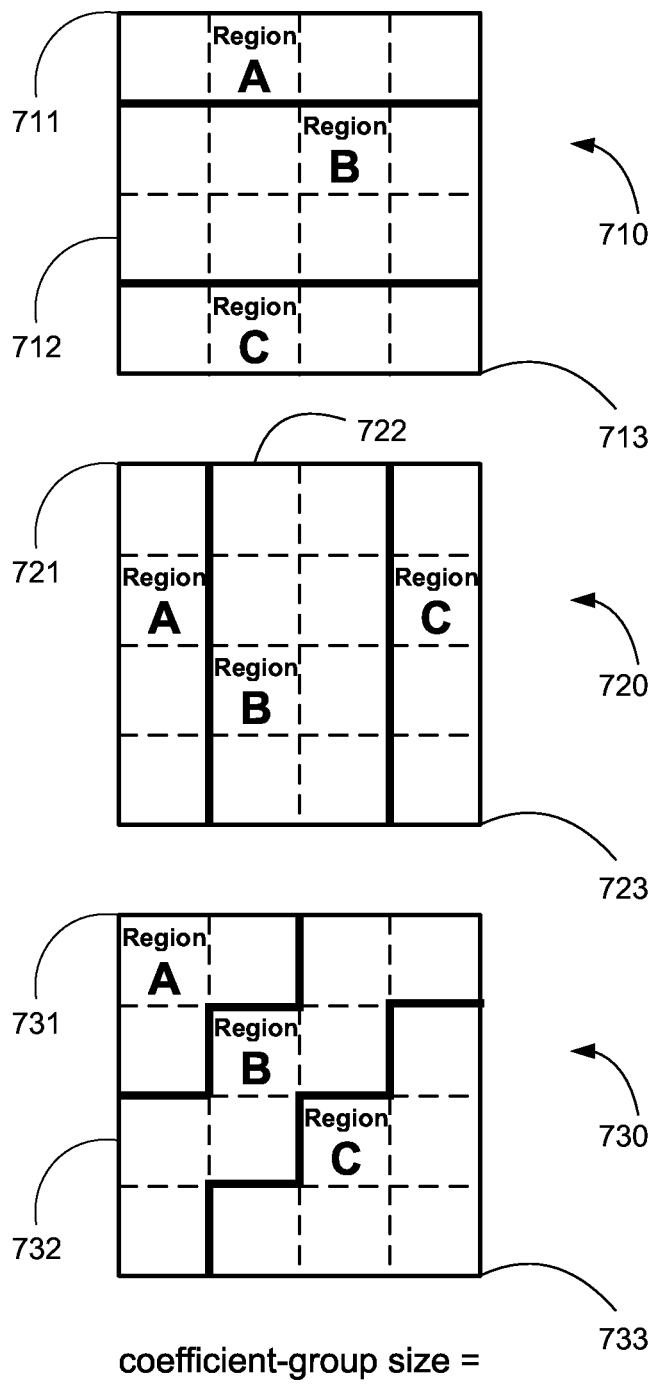
FIG. 7 depicts three different ways of partitioning the transform coefficients of a coefficient group into three disjoint regions of transform coefficients.

Reference is first made to FIG. 7, which depicts three different, novel ways of partitioning the transform coefficients of a coefficient group into three disjoint regions of transform coefficients for the purposes of deriving context for entropy encoding level-run pairs for the current CG. In each case illustrated, the size of the CG is 4 coefficients by 4 coefficients. Each partition is most suitable for intra-prediction modes in a respective one of the three classes defined above in reference to classification 200B of FIG. 2b (although they could also be used with classification 200A of FIG. 2a).

Partition 710 consists of three disjoint, horizontal strips of the CG: region A, feature 711, consisting of the top row; region B, feature 712, consisting of the middle rows; and region C, feature 713, consisting of the bottom row. This partition is designed for intra-prediction modes in the vertical class—assuming no block transpose is applied to the current block (or a portion including the current CG). If the mode is in the vertical class, but the current CG is affected by a transpose, then partition 720, described next, is employed.

Partition 720 consists of three disjoint, vertical strips of the CG: region A, feature 721, consisting of the left column; region B, feature 722, consisting of the middle columns; and region C, feature 723, consisting of the right column This partition is designed for intra-prediction modes in the horizontal class—assuming no block transpose is applied to the current block (or a portion including the current CG). If the mode is in the horizontal; class, but the current CG is affected by a transpose, then partition 710, described above, is employed.

Partition 730 consists of three disjoint, (roughly) diagonal strips of the CG: region A, feature 731, consisting of the three coefficients in the top-left corner of the CG; region C, feature 733, consisting of six coefficients in the bottom-right corner of the CG; and region B, feature 732, consisting of the remaining seven coefficients in a diagonal strip between region A and B. This partition is designed for intra-prediction modes in the diagonal class. This partition is invariant under transposition. In any case, as is mentioned above there is no reason to transpose for modes in the diagonal class, so considerations of whether the current CG is affected by a transpose are moot for modes in the diagonal class.

From what has already been said in respect of partitions 710 and 720, it should come as no surprise that utilizing either of these partitions for the purposes of deriving context for entropy encoding level-run pairs for the current CG depends on whether a transpose is employed. Thus, methods for mode-dependent context design that do not employ a transpose (FIGS. 8b and 8c) must be described separately for embodiments that might, under some circumstances, employ a transpose (FIG. 9a through 9c).

Figure 8A:
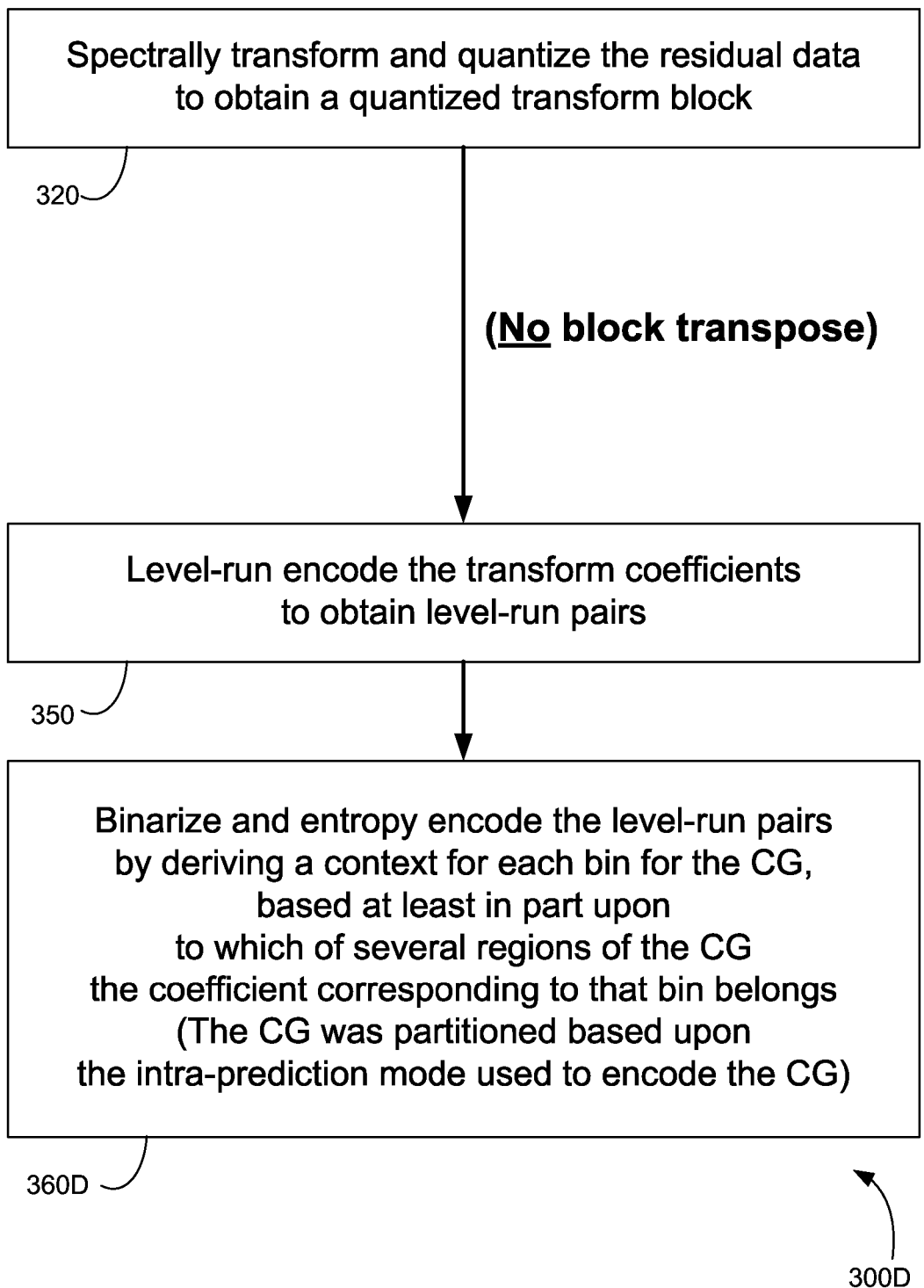
FIG. 8a shows a flowchart illustrating a known method for mode-dependent, level-run encoding of a block of residuals, without using a block transpose.
Figure 8B:
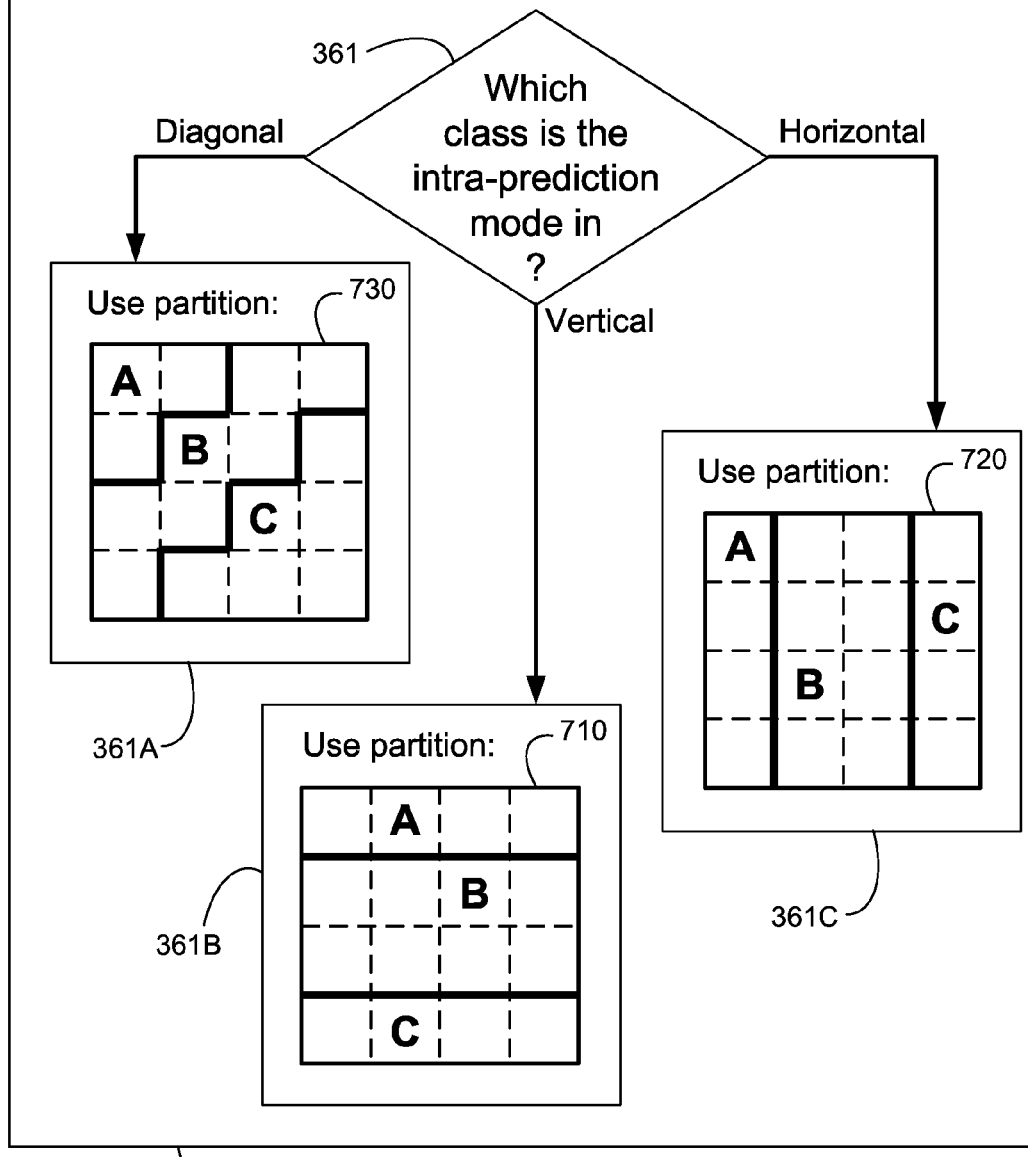
FIG. 8b shows a flowchart detailing one step of the method depicted in FIG. 8a, but adapted to illustrate the selection of a partition, from amongst those depicted in FIG. 7, according to a method of the present disclosure.
Figure 8C:
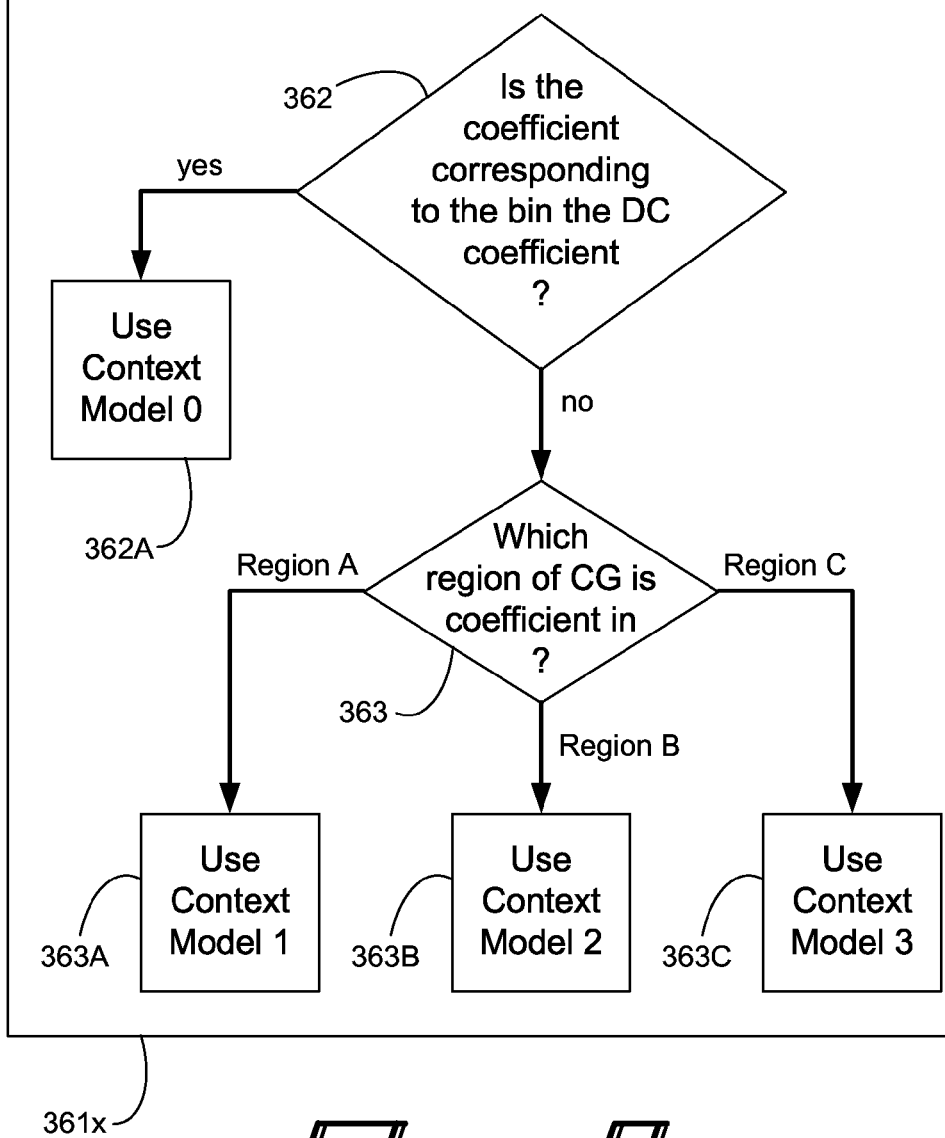
FIG. 8c shows a flowchart detailing the use of the partition selected according to the method depicted in FIG. 8b.
Figure 9A:
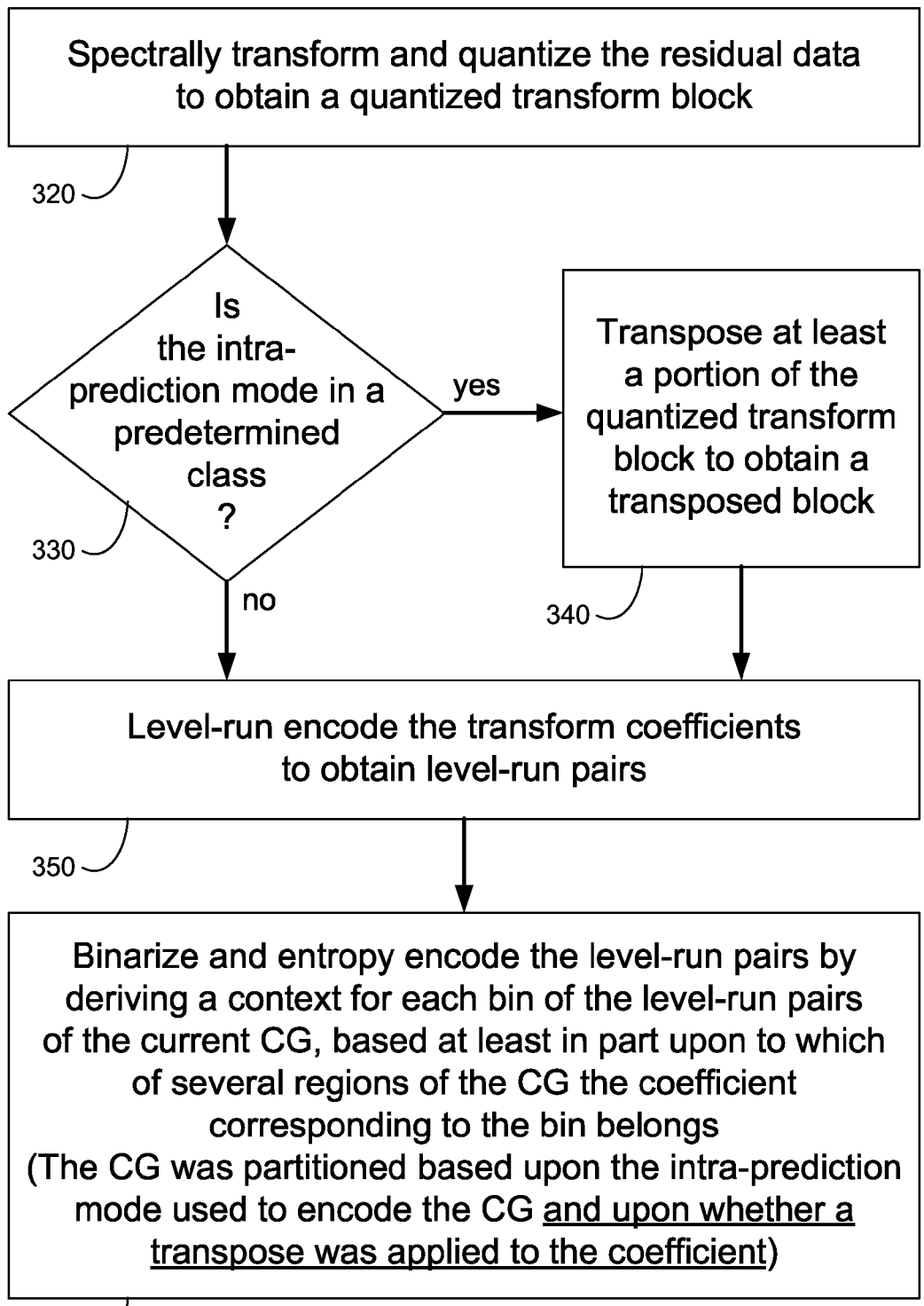
FIG. 9a shows a flowchart illustrating a method for mode-dependent encoding of a block of residuals, using a block transpose if the intra-prediction mode is in a predetermined class.
Figure 9B:
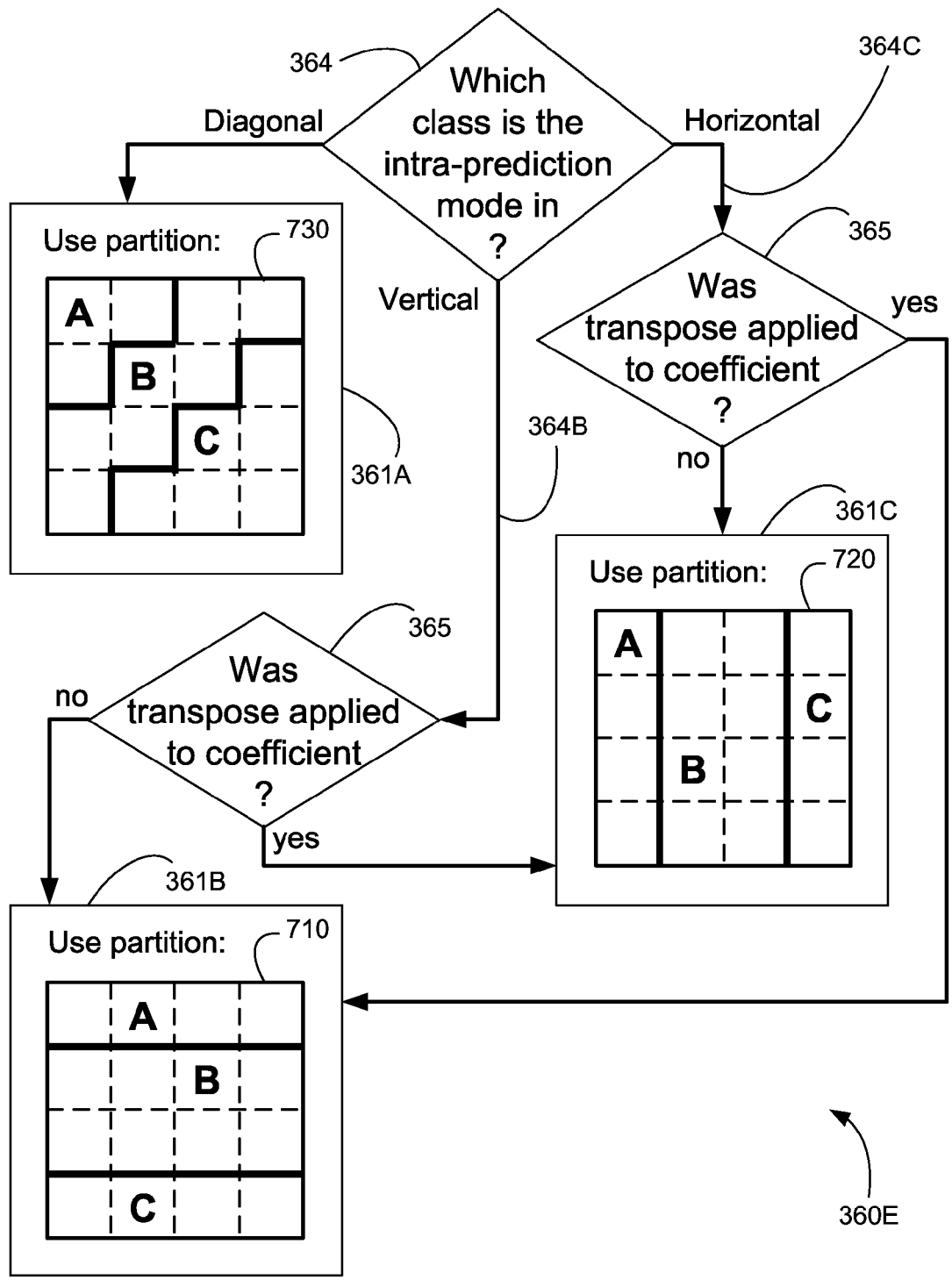
FIG. 9b shows a flowchart—analogous to that in FIG. 8b, but accommodating any usage of a block transpose—detailing one step of the method depicted in FIG. 8a, but adapted to illustrate the selection of a partition, from amongst those depicted in FIG. 7.

Reference is now made to FIGS. 8a through 8c, which each pertain to utilizing the partitions 710, 720, and 730 of FIG. 7 for the purposes of deriving context for entropy encoding level-run pairs for the current CG when no transpose is employed.

FIG. 8a shows a flowchart illustrating known method 300D for mode-dependent, level-run encoding of a block of residuals, without using a block transpose; it minors method 300A of FIG. 3A, with the omission of step 310. Steps 320 and 350 are exactly as in method 300A. Step 360D is a particular embodiment of step 360 in which the entropy encoding of level-run pairs is now done by deriving a context for each bin of the level-run pairs for the CG, based at least in part upon to which of several regions of the CG the coefficient corresponding to that bin belongs, with the CG having been partitioned into the regions based upon the intra-prediction mode used to encode the CG. (As mentioned above, the prior disclosure specified bipartite partitions.)

FIG. 8b shows a flowchart detailing step 360D', which is like step 360D of method 300D depicted in FIG. 8a, but adapted to illustrate the selection of a tripartite partition, from amongst those depicted in FIG. 7. At step 361, a determination is made as to which of the three classes the intra-prediction mode used to encode the current CG belongs. Depending on whether the mode belongs to the diagonal, vertical, or horizontal class, control is passed to step 361A, step 361B, or 361C, respectively, which performs the entropy encoding using partition 730, partition 710, or partition 720, respectively.

FIG. 8c shows a flowchart detailing step 361x—representing step 361A, 361B, or step 361C (as the case may be) of FIG. 8b—in which a context is derived based at least in part upon the partition (730, 710, or 720, respectively) selected at step 361 of FIG. 8b. At step 362, a determination is made as to whether the coefficient corresponding to the current bin of the level-run pair is the DC coefficient. (Since the DC coefficient is the top-left coefficient in the entire current block, this can only happen if the current CG is the top-left CG of the block.) If so, context model 0 is used in this one special case. Otherwise, the tripartite partition is used. At step 363, a determination is made as to which of the three regions the coefficient corresponding to the current bin of the level-run pair belongs. Depending on whether that coefficient belongs to the region A, B, or C, control is passed to step 363A, step 363B, or 363C, respectively, which performs the entropy encoding using context model 1, 2, or 3, respectively. In one sample embodiment, the context models for entropy encoding each bin of a run, may be given by the following pseudo-code:

If the current CG is the top-left CG,
   ctxInc(run) = regionCGIdx * 3 + min(2, (absSum+absLevel) / 2)
Otherwise,
   ctxInc(run) = (regionCGIdx - 1) * 3 + min(2, (absSum+absLevel) / 2) + 12 where regionCGIdx=i for context model i, i=0, 1, 2, or 3; absSum is a sum of the levels of the non-zero coefficients previously coded in reverse scan order; and absLevel is the level corresponding to that run in the level-run pair. Reference is now made to FIGS. 9a through 9c, which are also methods utilizing the partitions 710, 720, and 730 of FIG. 7 for the purposes of deriving context for entropy encoding level-run pairs for the current CG. However, in contrast to the methods of FIGS. 8a through 8c, these methods accommodate the possibility that a transpose is employed.

FIG. 9a shows a flowchart illustrating method 300E for mode-dependent encoding of a block of residuals, using a block transpose if the intra-prediction mode used in generating the encoded block is in a specific predetermined class. Method 300E differs from method 300B of FIG. 3b in that replacement step 360E now entropy encodes level-run pairs by deriving a context for each bin of the level-run pairs, based at least in part upon to which of several regions of the CG the (possibly transposed) coefficient corresponding to the bin belongs. The regions constitute a partition based upon the intra-prediction mode used to encode the CG and upon whether a transpose was applied to the coefficient at step 340. The first part of this conjoined condition is exactly the condition referred to in step 360D of FIG. 8a and detailed in step 360D' of FIG. 8b.

The second part of the condition—whether a transpose was applied at step 340—bears closer consideration. First, if the transpose applied is a full block transpose, the condition is equivalent to the condition of the test at step 330; in other words, the second condition can be tested in the same manner as at step 330.

Second, when judging the location of a coefficient to determine in which region that coefficient lies, it is the post-transpose position that is used.

Third, the significance of a transpose having been applied is that the partition must, in that case, likewise be "transposed." The point of transposing when, for example, the intra-prediction mode is in the horizontal class, is to position the transposed coefficients so that they are distributed similarly to the distribution for a mode in the vertical class; as mentioned earlier, in order to complete "tricking" encoder 100B into treating a transposed horizontal-mode block as if it were an untransposed vertical-mode block, a context index should be updated. If, as here, a partition is also used to derive context for a mode in the horizontal class when a transpose has been applied, then encoder 100B should be further tricked (by appropriate code) to employ the partition used for modes in the vertical class (without a transpose), i.e., partition 710. Again, this is to obtain the full benefit of deriving context based at least in part upon a partition of the current CG. Partition 710 is, in its layout, a transpose of partition 720 (for modes in the horizontal class, without a transpose), even if one partition is not literally generated from the other by application of a transpose. This conditional swapping of partitions will be detailed below in reference to FIG. 9b.

Fourth, if the transpose applied is just a partial block transpose, then an accommodation to account for that transpose is only made for coefficients to which that transpose was applied. (This treats all coefficients in the domain of that transpose equally, even those that lie on a diagonal that is invariant under that transpose.)

Finally, the skilled person recognizes that if the transpose applied is just a partial transpose, the partition that applies to a CG is transposed only if the transpose is applied to the CG. In such case, contexts are not fully shared, but encoding efficiency is still improved, because the distributions for different classes are more distinct.

FIG. 9b shows a flowchart—analogous to that in FIG. 8b, but accommodating any usage of a block transpose—detailing one step of the method depicted in FIG. 8a, but adapted to illustrate the selection of a partition, from amongst those depicted in FIG. 7. The adaptation is the addition of the determination at step 365, for modes in either of the vertical and horizontal classes, as to whether the transpose was applied to the coefficient corresponding to the bin being encoded. (As mentioned earlier, a transpose is not triggered for modes in the diagonal class.) If, for modes in the horizontal class, the answer is affirmative, then partition 710 (originally designed for modes in the vertical class) is used at step 361B instead of partition 720 (originally designed for modes in the horizontal class) at step 361C. If, for modes in the vertical class, the answer is affirmative, then partition 720 is used at step 361C instead of partition 710 at step 361B.

This flowchart is "overpowered" in that it can handle a partial or full block transpose either for modes in the horizontal class and/or for modes in the vertical class. In practice, a transpose would be done consistently for one particular class or the other, not sometimes for one and other times for the other. Thus, for actual programming of an encoding algorithm, the flowchart would not need to be as complex. For example, if the specific predetermined class that triggers a transpose is the horizontal class, then "vertical" line 364B out of test 364 could go directly (unconditionally) to step 361B, even if the transpose applied is a partial one; if the transpose applied is a full transpose, then "horizontal" line 364C out of 364 could also go directly to step 361B.

FIG. 9c shows a flowchart detailing one particular path 360E' through the flowchart of step 360E of FIG. 9b under the assumption that the specific predetermined class is the horizontal class. At step 364C, corresponding to "horizontal" line 364C of FIG. 9b, it is determined that the intra-prediction mode used to generate the encoded block is in the horizontal class (which is the specific predetermined class that trigger a transpose). Step 361A of FIG. 9b is detailed, showing how, under the circumstances (viz., application of a block transpose) partition 710, originally designed for modes in the vertical class, is employed. This is a particular embodiment of generic step 361x of FIG. 8c. In comparison to step 361x, region A is now the top row of the CG, region B is the middle two rows, and region C is now the bottom row.

Figure 10A:
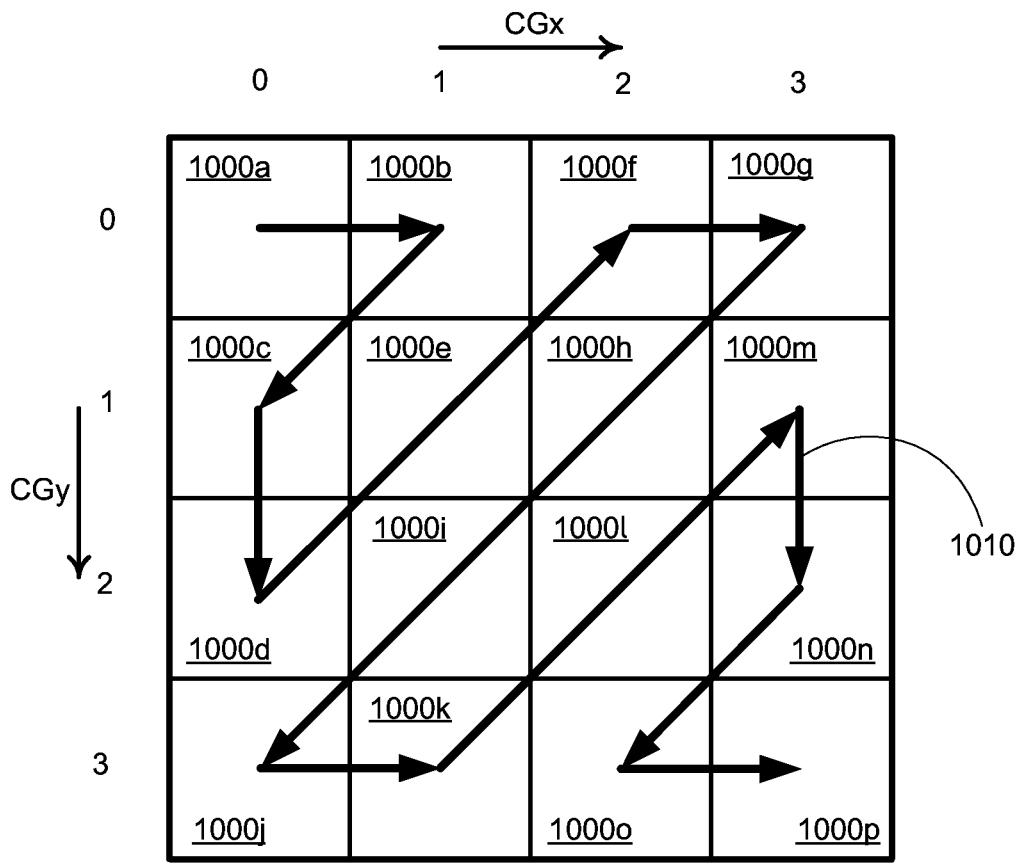
FIG. 10a shows a sample block—of size 16×16—partitioned into coefficient groups and illustrates a zig-zag group scan ordering of the coefficient groups within the block.
Figure 10C:
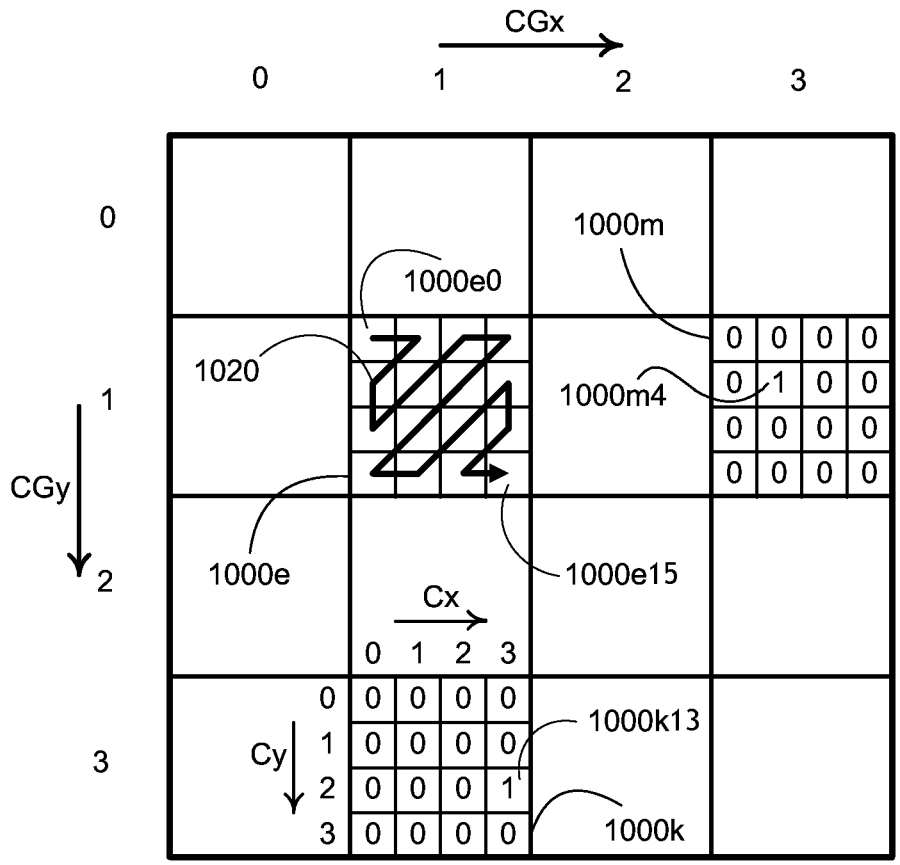
FIG. 10c shows in greater detail the same sample block depicted in FIG. 10a, illustrating (a) the scan ordering of transform coefficients within for one particular coefficient group and (b) the last non-zero coefficient (in the scan orderings) of two other coefficient groups.

Reference is now made to FIGS. 10a, 10b, and 10c to explain how an "overview" of a transform block is encoded to avoid unnecessarily encoding zero-valued transform coefficients. FIG. 10a shows a sample block 1000—of size 16×16, in this case—partitioned into coefficient groups—in four rows and four columns, in this case. Above and to the right of block 1000 are depicted the CGx- and CGy-coordinate axes for indicating a 2-dimensional position of CGs in terms of those columns and rows. Also shown is zig-zag group scan ordering 1010 of the coefficient groups within the block. The letters in the feature numerals of coefficient groups 1000a through 1000p reflect ordering 1010 from top-left CG 1000a to bottom-right CG 1000p. This particular zig-zag ordering begins with the CG at (1, 0) following the CG at (0, 0), but a "transposed" version of this ordering, in which the CG at (0, 1) follows the CG at (0, 0)—is also possible. Although the AVS2 standard specifies the zig-zag ordering depicted in FIG. 10a, other types of orderings, such horizontal (row-oriented) and vertical (column-oriented) orderings—whether bi-directional or uni-directional—may also used in video coding (and, therefore, are within the scope of the present disclosure).

FIG. 10b shows block 1000F of coefficient-group flags corresponding to the same sample block 1000 depicted in FIG. 10a and illustrates the location of the last non-zero coefficient group in the group scan ordering of the coefficient groups within the block. Each one indicates that the corresponding CG is a "non-zero" CG, i.e., it contains at least one non-zero transform coefficient; each zero indicates that the corresponding CG is a "zero" CG, i.e., it contains only zero-valued transform coefficients. According to ordering 1010, the last non-zero coefficient group (LNZCG) is flagged by flag 1000Cm, corresponding to CG 1000m of block 1000; the (x,y)-position of the two, corresponding blocks is (lastCGX, lastCGY)=(3, 1). (Those skilled in the art typically refer to the last non-zero CG in a block as the "last" CG, since it is the last one that need be encoded; during decoding, all the coefficients in subsequent CGs in the group scan ordering are inferred to be zero.) In CGs 1000n, 1000o, and 1000p, which are subsequent to LNZCG 1000m in the group scan ordering, there are only zero-valued transform coefficients. Not only is there no need to encode these zeroes, by encoding the position of LNZCG 1000m (in terms of x- and y-coordinates, as here, or as a one-dimensional position in the group scan order), there is also no need to encode zero-valued flags corresponding to CGs 1000n, 1000o, and 1000p. Given the missing data, indicated by the "n/a" ("not applicable") notations, flag block 1000F, can thus be viewed as a "partial" block (which, nevertheless, serves a role in reconstructing a complete block).

FIG. 10c shows some coefficient-level details for the same sample block 1000 depicted in FIG. 10a. For CG 1000e, scan ordering 1020 of transform coefficients within that CG is depicted. As with the group scan ordering at the CG level, the scan ordering at the coefficient level proceeds from top-left coefficient 1000e0 to bottom-right coefficient 1000e15, starting with a zig to the right and then a diagonal zag. Also as with group scan ordering, although the one depicted in FIG. 10c is the one specified by the AVS2 standard, other scan orderings at the coefficient level are possible (and within the scope of the present disclosure). The Cx- and Cy-coordinate axes for indicating a 2-dimensional position of transform coefficients are also depicted above and to the right of CG 1000k. For coefficient groups 1000k and 1000m, respective last non-zero coefficients (LNZCs) 1000k13 and 1000m3 in the scan orderings of these coefficient groups are depicted. For CG 1000k, (lastPosX, lastPosY)=(3, 2). For CG 1000m, (lastPosX, lastPosY)=(1, 1).

All scan orderings are asymmetric. For example, scan ordering 1020 is not invariant under a transpose of the CG or any other flip of the CG. As mentioned briefly in relation to transposing blocks, it has been now realized that there is an advantage to transposing a block intra-prediction modes in the horizontal class (as opposed to the vertical class), because of the particular zig-zag scan ordering 1020 of coefficients within a CG and also the group scan ordering 1010 of CGs within a block, each of which zigs right (rather than down) before zagging diagonally. For modes in the vertical class, the LNZC is usually in the first two rows, whereas for modes in the horizontal class, the LNZC is usually in the first two columns By transposing the block for a horizontal mode, the LNZC is moved to the first two rows, which on average reduces the number of coefficients to be scanned, thus benefitting coding efficiency.

Mode-Dependent Coding of the (x,y)-Position of the LNZC of a Coefficient Group

It has now been realized that that after the intra prediction and transform processes in video compression, when a CG is located on the top edge of the transform block, the LNZC in that CG tends to be located close to the top of the CG. Similarly, when a CG is located on the left edge of the transform block, the LNZC tends to be located close to the left of the CG.

Figure 11A:
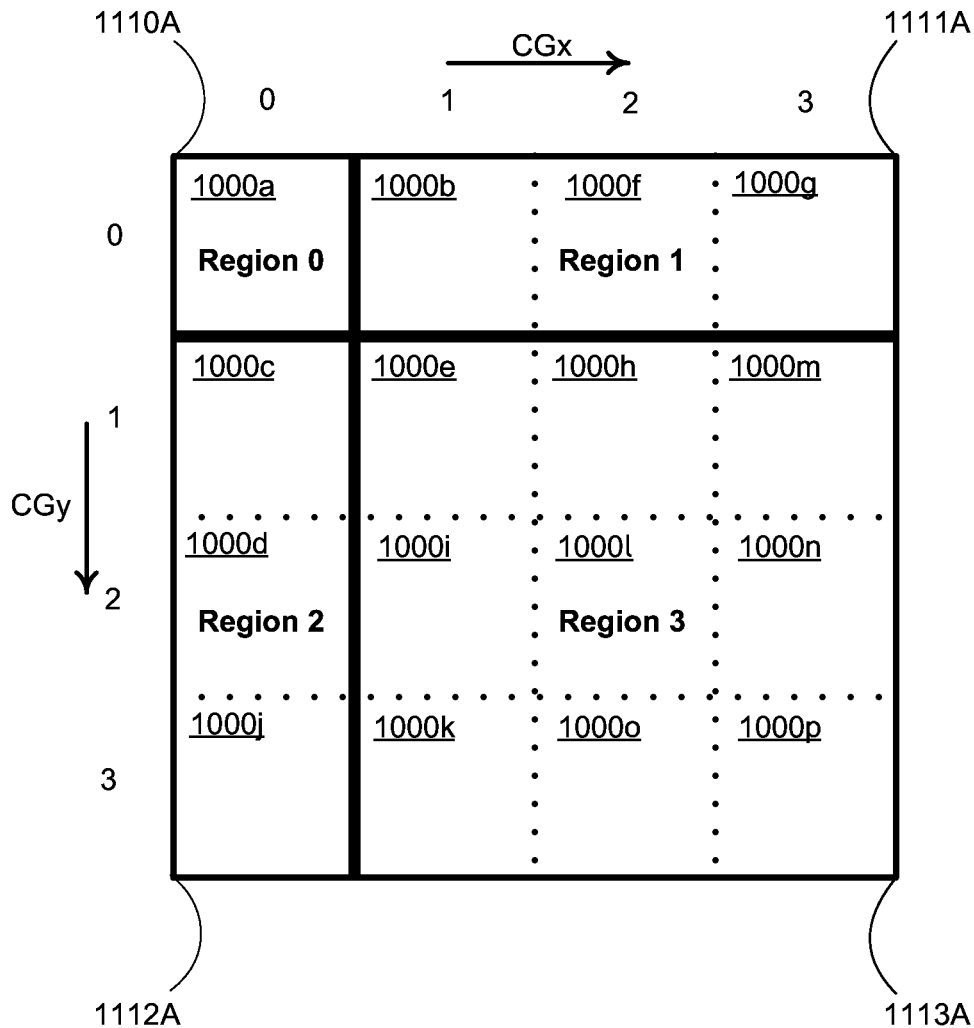
FIG. 11a depicts the same sample block depicted in FIG. 10a together with a way of partitioning the coefficient groups of a block into four disjoint regions of coefficient groups.
Figure 11B:
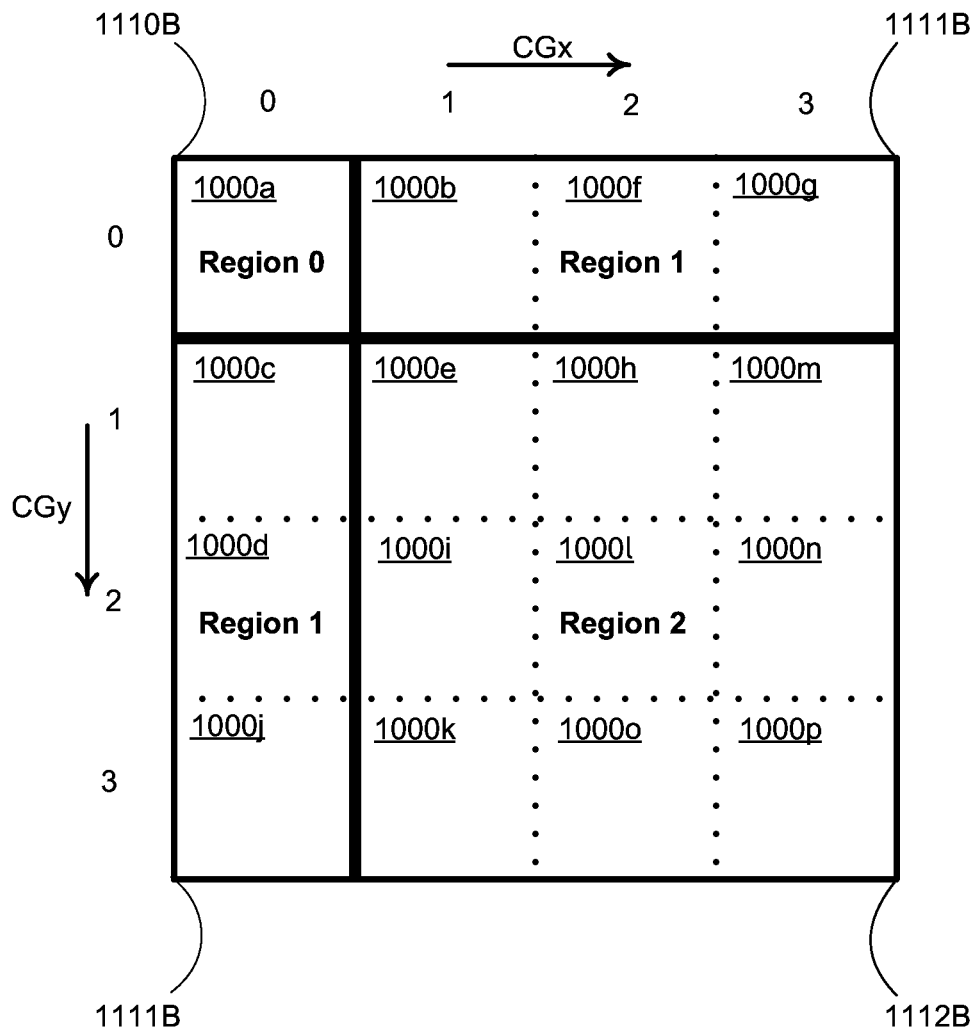
FIG. 11b depicts the same sample block depicted in FIG. 10a together with a way of partitioning the coefficient groups of a block into three disjoint regions of coefficient groups.
Figure 12:
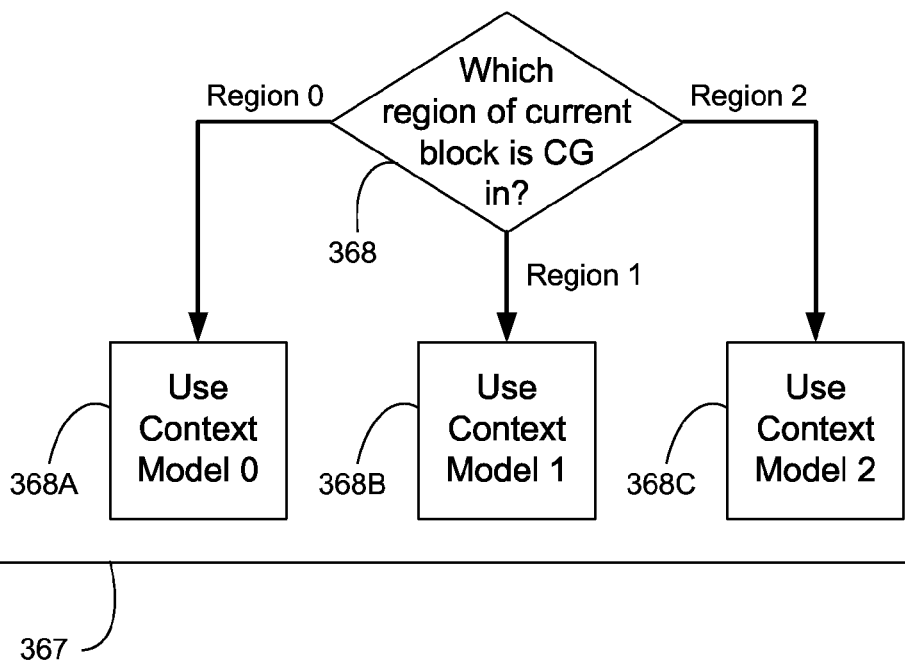
FIG. 12 shows a flowchart detailing the use of the partition depicted in FIG. 11b.

Two different partitions, of transform block 1000 of FIG. 10a, for the purposes of exploiting this observation are depicted in FIGS. 11a and 11b. FIG. 12 illustrates how to use one of these partitions.

In FIG. 11a, partition 1100A partitions the coefficient groups of block 1000 into four disjoint regions of coefficient groups. These regions are: Region 0, feature 1110A, consisting of top-left CG 1000a alone; Region 1, feature 1111A, consisting of CGs on the top edge of block 1000 except top-left CG 1000a; Region 2, feature 1112A, consisting of CGs on the left edge of the block except top-left CG 1000a; and Region 3, feature 1113A, consisting of all CGs on neither the left edge nor the top edge of the block.

In FIG. 11b, on the other hand, partition 1100B partitions the coefficient groups of block 1000 into three disjoint regions of coefficient groups. These regions are: Region 0, feature 1110B, consisting of top-left CG 1000a alone; Region 1, feature 1111B, consisting of CGs on either the left edge or the top edge of the block, but not both; and Region 2, feature 1112B, consisting of all CGs on neither the left edge nor the top edge of the block.

FIG. 12 shows a flowchart detailing the use of the tripartite partition 1100B depicted in FIG. 11b. At step 368, a determination is made as to which of Region 0, Region 1, and Region 2 the current CG belongs. Depending on whether that region is Region 0, 1, or 2, the (x,y)-position of the LNZC in that CG is encoded based on context model 0 at step 368A, context model 1 at step 368B, or context model 2 at step 368C, respectively. In one sample embodiment, the context models for entropy coding the (x,y)-position of the LNZC in the current CG are determined based on the region index, intra-prediction mode classification, and bin index, as shown in the following pseudo-code:

If the current CG belongs to Region 2,
 ctxInc(lastPosX) = min(binIndex, 1);
 ctxInc(lastPosY) = min(binIndex, 1);
Otherwise,
 ctxInc(lastPosX) =
  regionIndex * 4 + (intraModeIdx >0) * 2 + min(binIndex, 1) + 2;
 ctxInc(lastPosY) =

```
regionIndex * 4 + (intraModeIdx >0) * 2 + min(binIndex, 1) + 2;where
intraModeIdx   = 0, if the intra-prediction mode is in the vertical class
               = 1, if the intra-prediction mode is in the horizontal class
               = 2, otherwise
```

Coding Position Data for the Last Non-Zero Coefficient in a Coefficient Group

In unified AVS2 coding design, the (x,y)-position of the last non-zero coefficient in a CG is coded as (X, Y), where the origin (0, 0) is the top-left coefficient position of the CG. Unary binarization is applied to the coordinate (X, Y). If the current CG is not the LNZCG, usually the last non-zero coefficient position of the current CG is located close to the bottom-right, bottom-left or top-right coefficient position, in which cases coding (X, Y) is not efficient, because at least one of the two coordinates will be close to the value 3, which is the longest of the coordinates values (0 through 3) that might ever be encoded for a CG, which, for compliance with the AVS2 standard, always has size 4×4.

Figure 13:
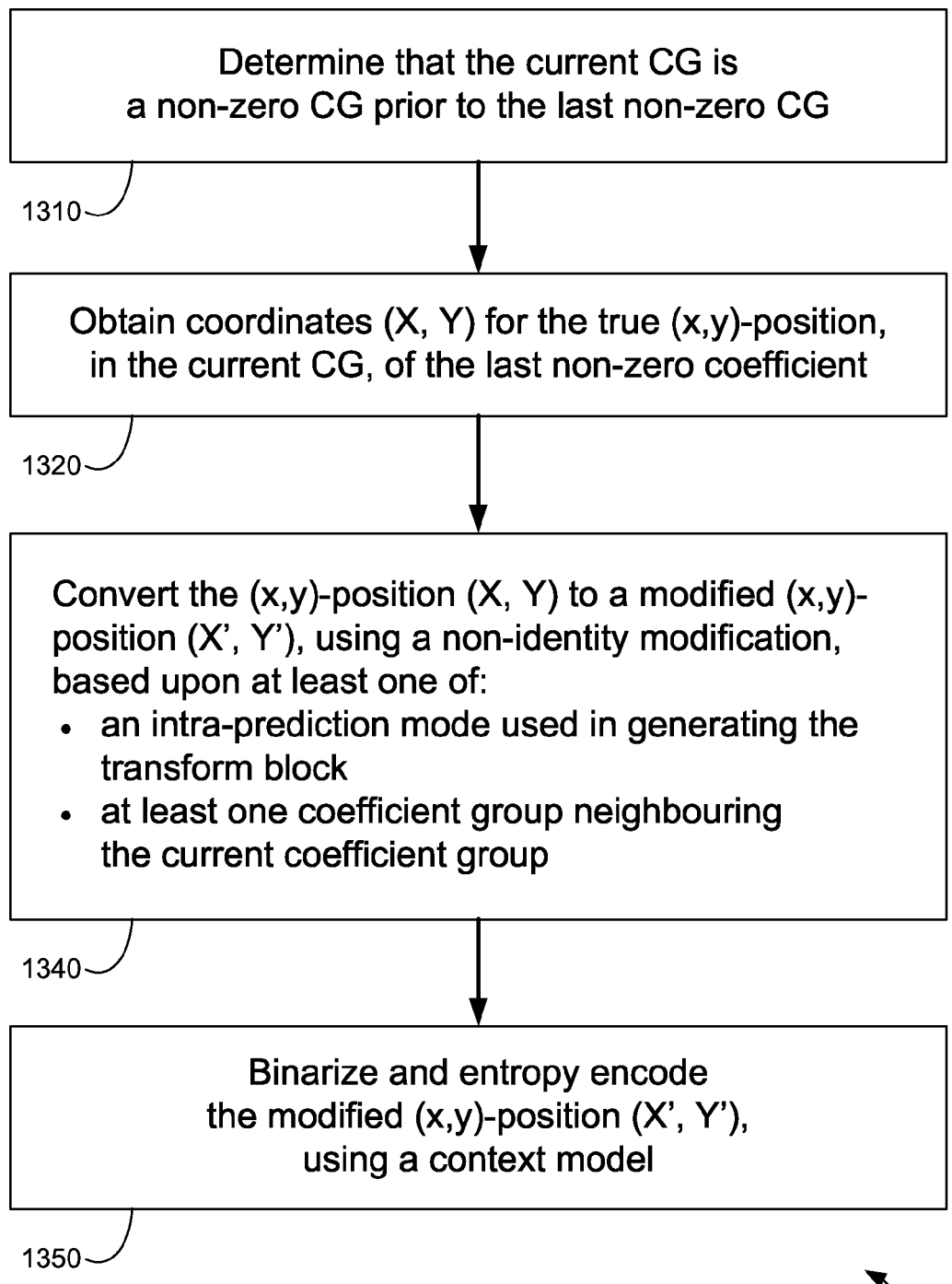
FIG. 13 shows a flowchart illustrating a method for encoding a modified representation of the (x,y)-position of the last non-zero coefficient in the scan ordering of the current coefficient group being encoded.

A technical application of this observation is shown very generally in FIG. 13, in which a flowchart illustrates novel method 1300 for encoding a modified representation of the (x,y)-position of the last non-zero coefficient in the scan ordering of the current coefficient group being encoded. In specific embodiments for AVS2-compliant CGs, which have size 4×4, the modifications result in (perhaps conditionally) converting values of 3 and 2 to 0 and 1, respectively; on average, this improves coding efficiency.

Figure 13A:
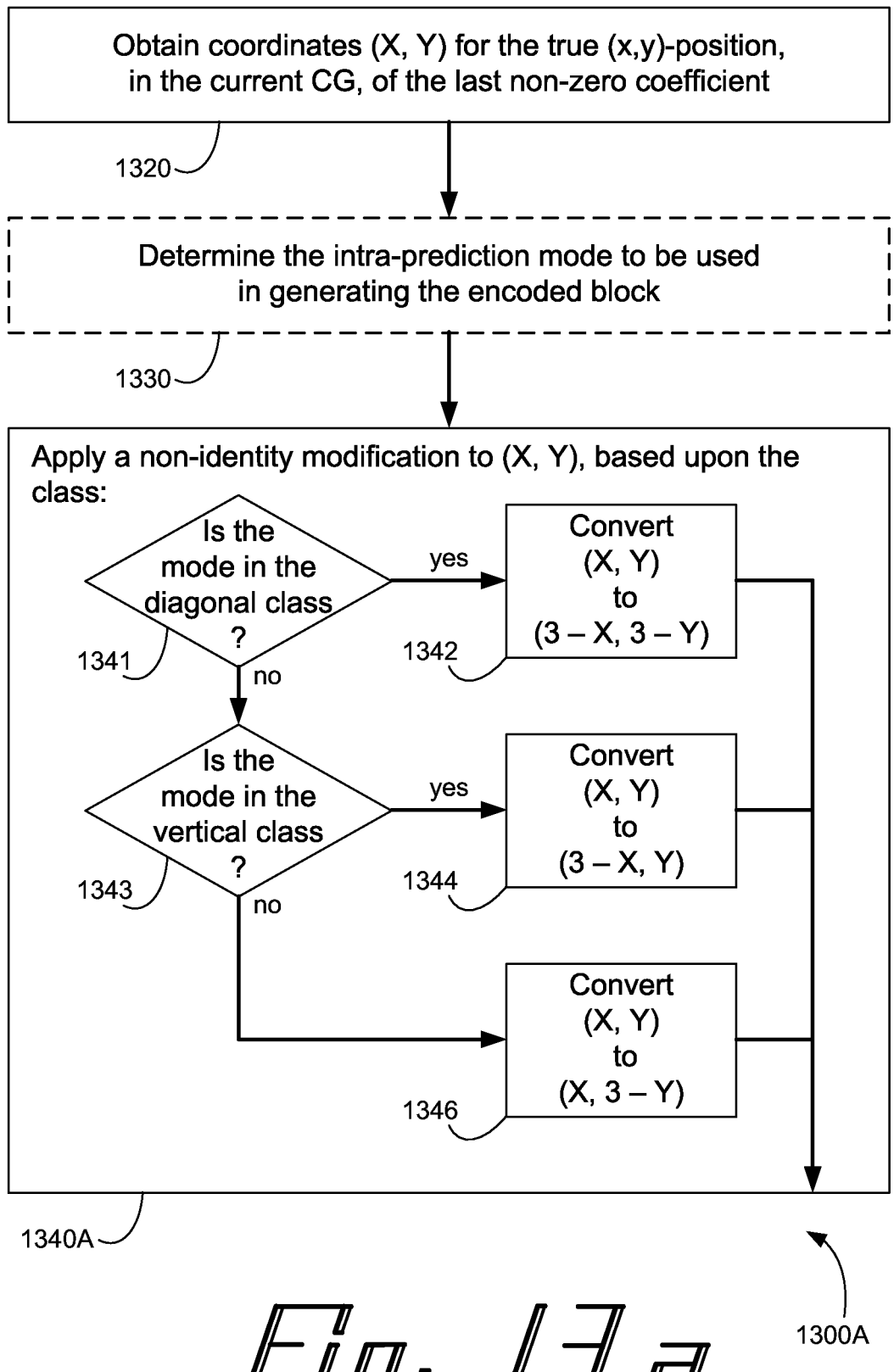
FIG. 13a shows a flowchart illustrating one embodiment—modifying the (x,y)-position based upon the class to which the intra-prediction mode belongs—of one step of the method depicted in FIG. 13.
Figure 13B:
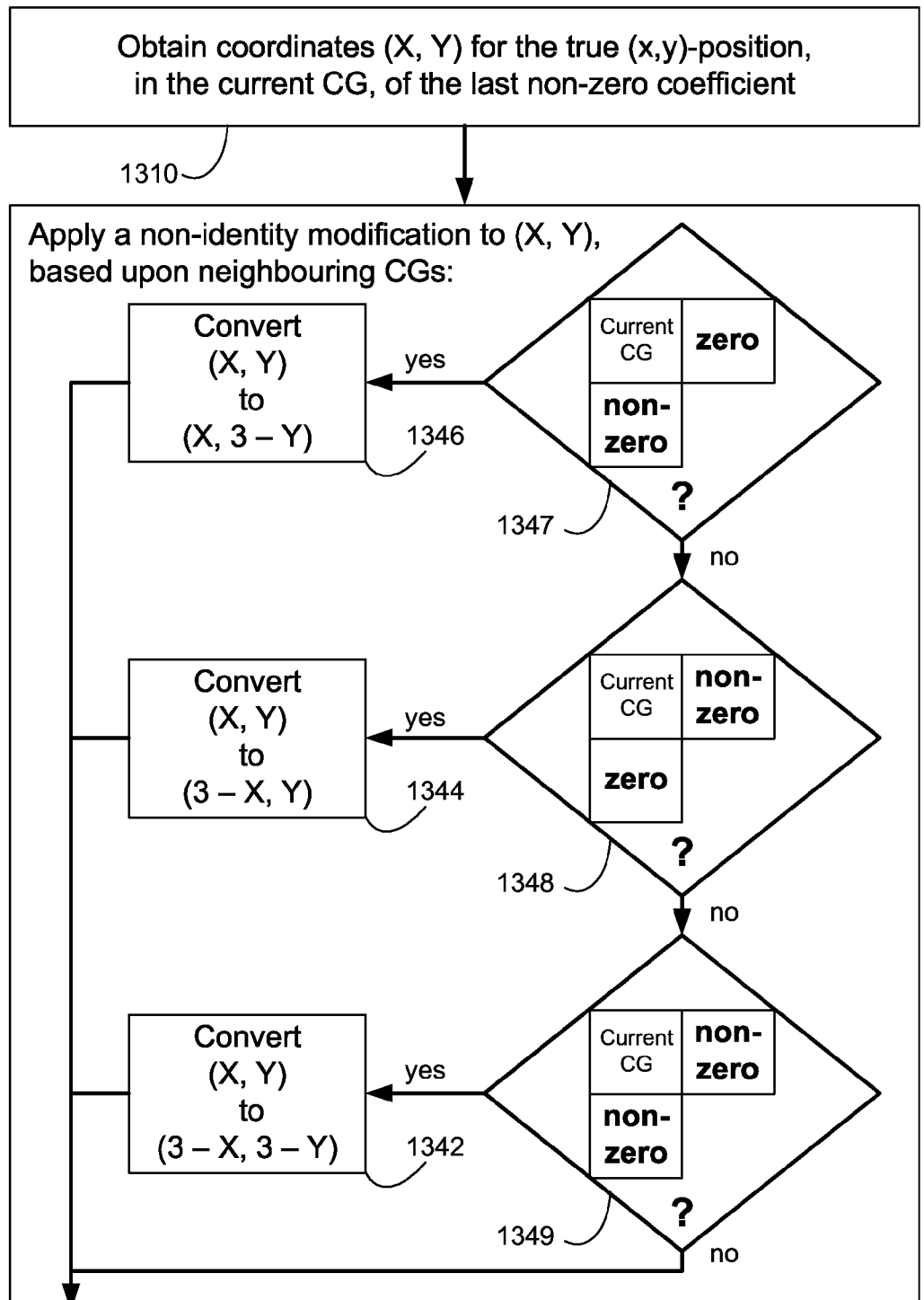
FIG. 13b shows a flowchart illustrating another embodiment—modifying the (x,y)-position based upon at least one neighbouring coefficient group of the current coefficient group—of one step of the method depicted in FIG. 13.
Figure 13C:
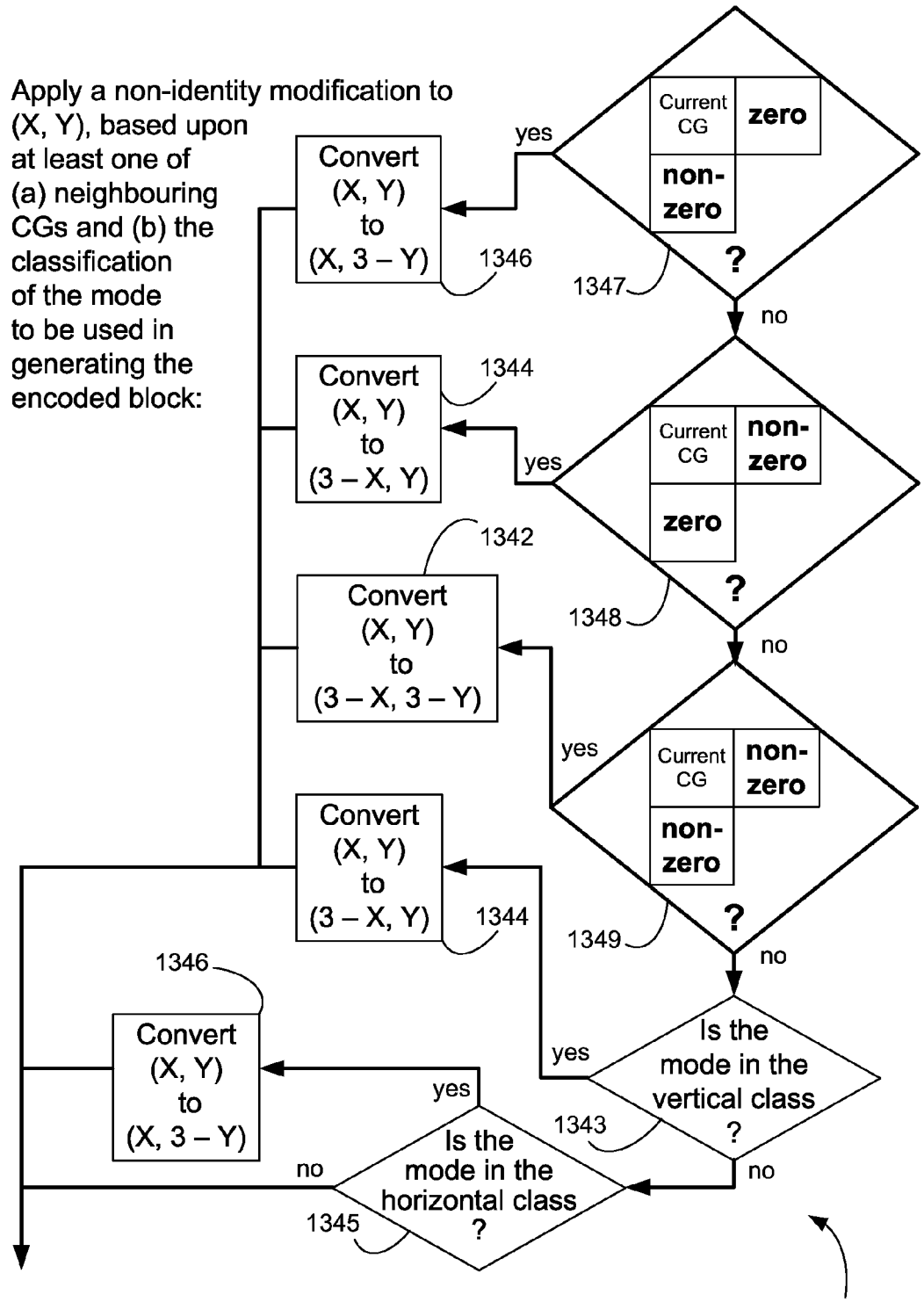
FIG. 13c shows a flowchart illustrating yet another embodiment—modifying the (x,y)-position based both upon the class to which the intra-prediction mode belongs and upon at least one neighbouring coefficient group of the current coefficient group—of one step of the method depicted in FIG. 13.

This general method only applies for CGs that are non-zero CGs prior to the LNZCG. Hence, the first step in method 1300 is to determine at step 1310 that current CG meets these requirements. Then at step 1320, the (x,y)-position (X, Y), in the current CG, of the last non-zero coefficient is obtained. Subsequently, at step 1340, a non-identity modification applied to the coordinates (X, Y) to compute a modified (x,y)-position (X', Y'). The modification is based upon at least one of (a) the intra-prediction mode used in generating the encoded block and (b) at least one coefficient group neighbouring the current coefficient group. Embodiments in which the modification is based upon (a), based upon (b), and based upon both are illustrated in FIGS. 13a to 13c, respectively. Finally, at step 1350, the modified (x,y)-position (X', Y') is binarized and entropy encoded using a context model.

FIG. 13a shows a flowchart illustrating method 1300A, which is one embodiment—modifying the (x.y)-position based upon the class to which the intra-prediction mode belongs—of method 1300 depicted in FIG. 13, with step 1310 omitted. Step 1330, not shown in FIG. 13, is included in FIG. 13a because determination of the intra-prediction mode to be used in generating the encoded block is now essential in this embodiment. It is depicted with a dashed outline because (a) it need not occur subsequent to step 1320 and (b) determination of the intra-prediction mode would always be made (by coding mode selector 160 of FIG. 1a), irrespective of this method, in order to perform spatial prediction (by means of spatial predictor 105).

The essence of method 1300A is step 1340A. In this sample embodiment, application of the modification depends on the class to which the intra-prediction mode belongs. At step 1341, it is determined whether the class is the diagonal class. If so, then at step 1342, the true (x,y)-position (X, Y) of the LNZC is converted to (3—X, 3—Y). If not, then at step 1343, it is determined whether the class is the vertical class. If so, then at step 1344, the true (x,y)-position (X, Y) of the LNZC is converted to (3—X, Y). If not, then at step 1346, the true (x,y)-position (X, Y) of the LNZC is converted to (X, 3—Y); in this last case, by the process of elimination, it is implicit that the intra-prediction mode is in the horizontal class.

It is basic logic that the three different conversions can be achieved in exactly the same three respective conditions by other testing sequences. There may be some advantage to one particular sequence if more-frequently occurring conditions are tested earlier (thereby reducing the average number of tests performed). Since the diagonal class, as defined in the present disclosure, occurs most frequently, the particular testing sequence depicted in FIG. 13a benefits, on average, from its testing first for the diagonal class.

FIG. 13b shows a flowchart illustrating method 1300B, which is another embodiment—modifying the (x,y)-position based upon at least one neighbouring coefficient group of the current coefficient group—of method 1300 depicted in FIG. 13, with step 1310 omitted. In this sample embodiment, the application of the modification at step 1340B depends on which of the previously processed CGs neighbouring the current CG (namely, the ones immediately to the right or below the current CG) are zero and which are non-zero. At step 1347, it is determined whether the right-neighbour is zero and the below-neighbour is non-zero. If so, then at step 1346, the true (x,y)-position (X, Y) of the LNZC is converted to (X, 3—Y). If not, then at step 1348, it is determined whether the right-neighbour is non-zero and the below-neighbour is zero. If so, then at step 1344, the true (x,y)-position (X, Y) of the LNZC is converted to (3—X, Y). If not, then at step 1349, it is determined whether the right-neighbour and the below-neighbour are both non-zero. If so, then at step 1342, the true (x,y)-position (X, Y) of the LNZC is converted to (3—X, 3—Y). If not, then no conversion takes place, i.e., the true (x,y)-position (X, Y) is not arithmetically modified before it is encoded; in this last case, by process of elimination, it is implicit that the right-neighbour and the below-neighbour are both zero.

It is basic logic that the three different conversions can be achieved in exactly the same three respective conditions by other testing sequences. There may be some advantage to one such sequence if more-frequent conditions are tested earlier (thereby reducing the average number of tests performed).

FIG. 13c shows a flowchart illustrating step 1340C of yet another embodiment of method 1300 depicted in FIG. 13. In this sample embodiment, the application of the modification of the (x.y)-position is based upon at least one of (a) at least one CG neighbouring the current CG and (b) the classification of the intra-prediction mode to be used in generating the encoded block. At step 1347, it is determined whether the right-neighbour is zero and the below-neighbour is non-zero. If so, then at step 1346, the true (x,y)-position (X, Y) of the LNZC is converted to (X, 3—Y). If not, then at step 1348, it is determined whether the right-neighbour is non-zero and the below-neighbour is zero. If so, then at step 1344, the true (x,y)-position (X, Y) of the LNZC is converted to (3—X, Y). If not, then at step 1349, it is determined whether the right-neighbour and the below-neighbour are both non-zero. If so, then at step 1342, the true (x,y)-position (X, Y) of the LNZC is converted to (3—X, 3—Y). If not, then then at step 1343, it is determined whether the intra-prediction mode is in the vertical class. If so, then at step 1344, the true (x,y)-position (X, Y) of the LNZC is converted to (3—X, Y). If not, then then at step 1345, it is determined whether intra-prediction mode is in the horizontal class. If so, then at step 1346, the true (x,y)-position (X, Y) of the LNZC is converted to (X, 3—Y). If not, then no conversion takes place, i.e., the true (x,y)-position (X, Y) is not arithmetically modified before it is encoded; in this last case, by process of elimination, it is implicit that the right-neighbour and the below-neighbour are both zero and the intra-prediction mode is in the diagonal class.

It is basic logic that the three different conversions can be achieved in exactly the same three respective conditions by other testing sequences. There may be some advantage to one such sequence if more-frequent conditions are tested earlier (thereby reducing the average number of tests performed).

Figure 14:
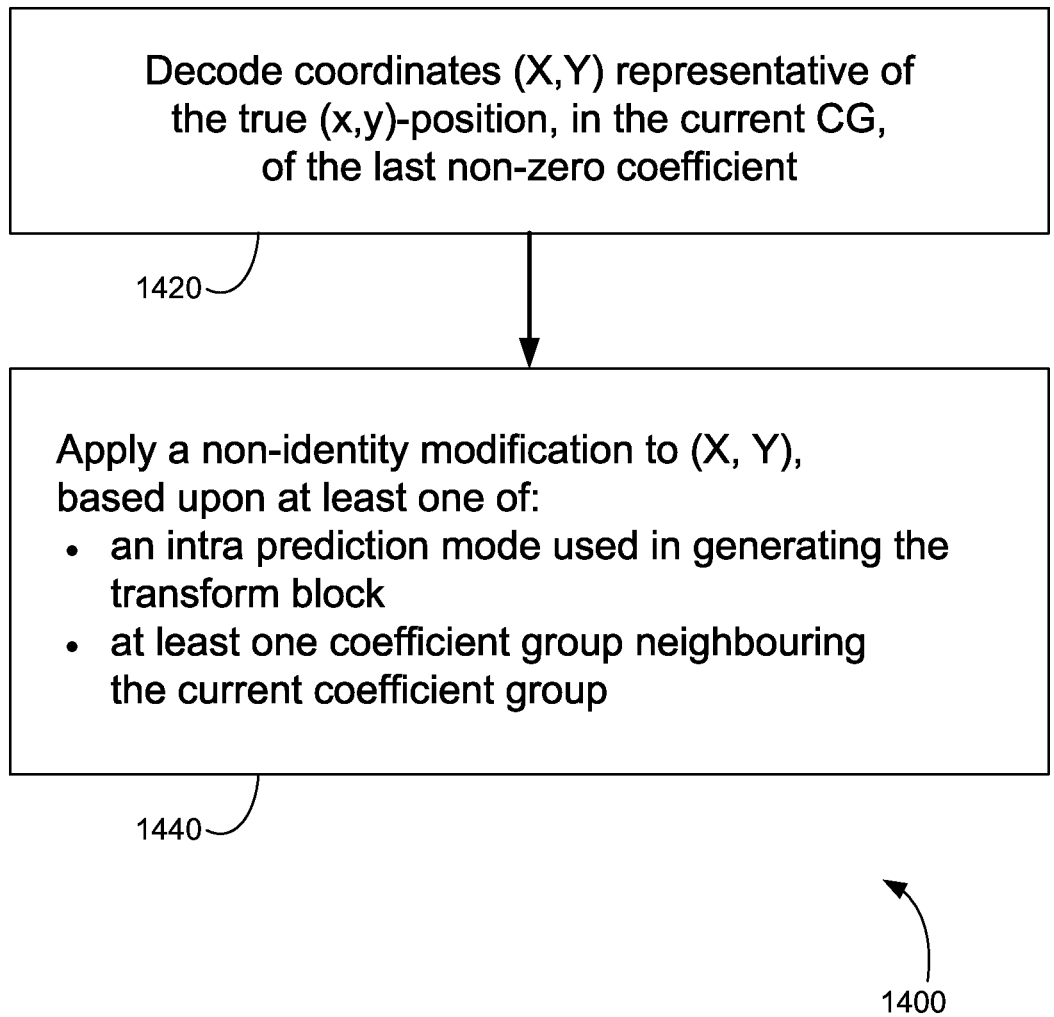
FIG. 14 shows a flowchart illustrating a method for decoding, for a current coefficient group, an encoded representation of the true (x,y)-position of the last non-zero coefficient in the scan ordering of that coefficient group and converting the representation to obtain the true (x,y)-position.

Turning now to FIG. 14, a flowchart is shown illustrating method 1400 for decoding video encoded according to method 1300 as outlined in FIG. 13. During the block-by-block processing of such an encoded video, at step 1410, for the current coefficient group in the current block, a modified, encoded representation (X, Y) of the true (x,y)-position of the last non-zero coefficient in the scan ordering of that coefficient group is decoded. Then, at step 1440, a non-identity modification is applied to the modified representation (X, Y) to obtain the true (x,y)-position. As with method 1300, the modification is based upon at least one of (a) an intra-prediction mode used in generating the encoded block and (b) at least one coefficient group neighbouring the current coefficient group an intra-prediction mode used in generating the encoded block.

Method 1400 as depicted in FIG. 14 and as just described, is sufficiently general that it is applicable to video encoded according to any of the various embodiments within the scope of method 1300, such as methods 1300A, 1300B, or 1300C as depicted in FIGS. 13A, 13B, and 13C, respectively, and discussed in detail above. Of course, it cannot be simultaneously applicable to every encoding embodiment within the scope of method 1300. To be compatible with any particular embodiment of method 1300, method 1400 must have an embodiment of modification step 1440 that is compatible with corresponding step 1340 of method 1300. It will be apparent that modification step 1440 must be the inverse of step 1340. More specifically, in each possible circumstance—whether based upon an intra-prediction mode used in generating the encoded block or upon at least one coefficient group neighbouring the current coefficient group an intra-prediction mode used in generating the encoded block—the conversion of (X, Y) at step 1440 must un-do whichever conversion of (X, Y) was performed at step 1340 during encoding of the current block.

Since 3—(3—X)=X and 3—(3—Y)=Y, each of the various conversions that might be used at step 1340 under different conditions—viz., (X, Y)→(X, 3—Y), (X, Y)→(3—X, Y), and (X, Y)→(3—X, 3—Y)—is a period-two operation, meaning that applying it twice amounts to applying the identity (i.e., do-nothing) operation. Said another way, each conversion is its own inverse. The ultimate consequence of this is that, in practice, the variant of step 1440 needed for method 1400 to be compatible with a particular embodiment of method 1300 is, in fact, the same as the variant of step 1340 used in that embodiment of method 1300. Such being the case, the three variants of method 1400 that are compatible with corresponding methods 1300A, 1300B, and 1300C are not depicted in separate figures.

Figure 15:
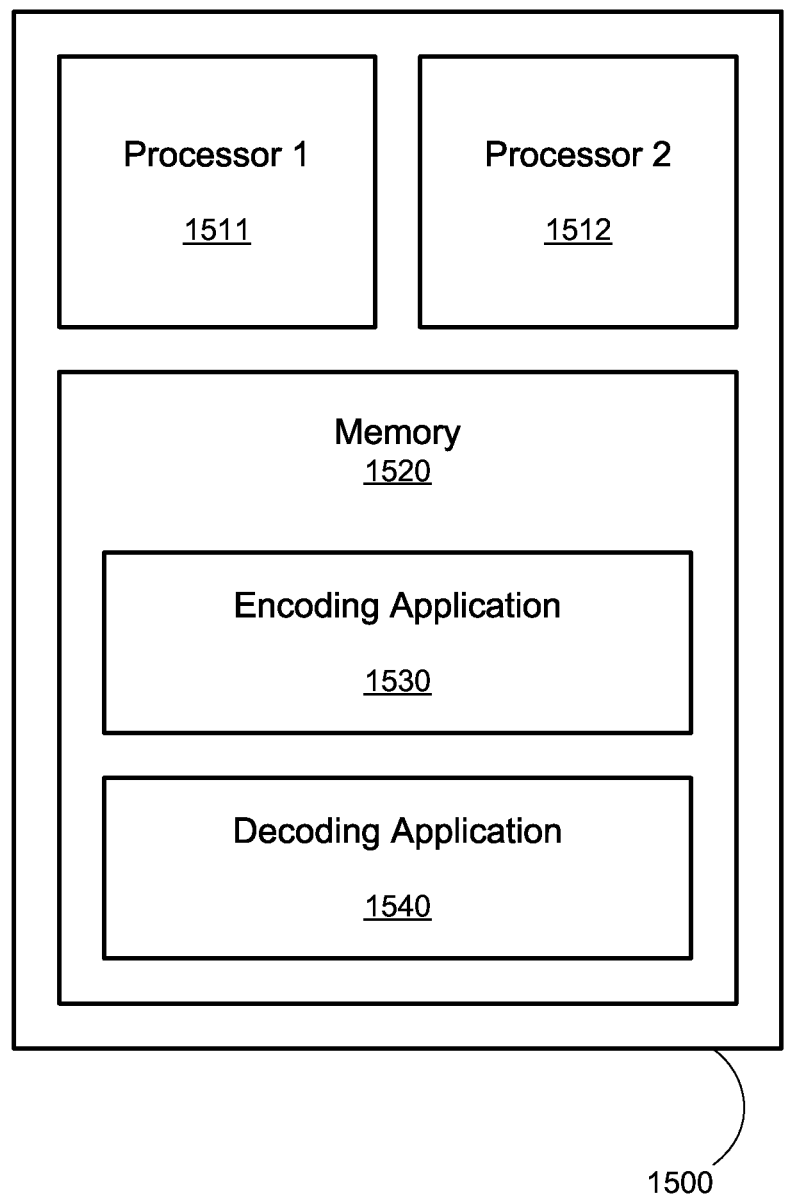
FIG. 15 shows a simplified block diagram of an example embodiment of a device incorporating a decoder and an encoder according the present disclosure.

Finally, reference is made to FIG. 15, which shows a simplified block diagram of an example embodiment of computing device 1500, which may be any of a variety of devices, including, without limitation, servers, suitably-programmed general purpose computers, audio/video encoding and playback devices, set-top television boxes, television broadcast equipment, DVD or Blu-Ray players, and mobile devices (such as smartphones, tablets, phablets, and the like) that may function as an encoder, as a decoder, or as both. Device 1500 is depicted as having two processors, 1511 and 1512, to control the functioning of the device, but it is well known that a computing device can be designed to have a single general-purpose processor or to have any number of general- and/or special-purpose processors. Device 1500 includes memory 1520, which may include a non-transitory processor-readable medium capable of storing processor-executable instructions that may be executed by one or more processors in device 1500, for example, processors 1511 and 1512. The medium may be unitary or may consist of several parts. It may be of one or more types, such as a compact disc, a flash memory device, random access memory (RAM), read-only memory (ROM), a hard drive, an application-specific integrated chip (ASIC), etc. Memory 1520 or parts thereof may be removable from device 1500 and/or permanently affixed therein. The nature of memory 1520 or parts thereof may render the instructions stored therein immutable and/or re-programmable; re-programmable memory may be volatile or non-volatile. In various embodiments, the instructions may be said to be implemented in the form of hardware, firmware, and/or software.

The processor-executable instructions stored in memory 1520, when executed by one or more processors in device 1500, for example, processors 1511 and 1512, may configure device 1500 to perform a variety of functions. Certain groups of such processor-executable instructions may constitute computer programs, also referred to as "computer applications" or just "applications," for short. In particular, memory 1520 may store (in a processor-readable medium) encoding application 1530 capable of performing one or more methods according to the present disclosure—in which case device 1500 is an encoder, such as encoder 100B. Alternatively, memory 1520 may store decoding application 1540 capable of performing one or more decoding methods according to the present disclosure—in which case device 1500 is a decoder, such as decoder 500B. As a further alternative, memory 1520 may store both encoding application 1530 and decoding application 1540—in which case device 1500 is both an encoder and a decoder.

Memory 1520 may be an apparatus for reconstructing a current block of residual data, using a video decoder, from an encoded block of residual data in a bitstream of encoded video. This apparatus comprises: (a) means for determining that a mode used in generating the encoded block is an intra-prediction mode in a predetermined class; (b) means for entropy decoding the encoded block to obtain an entropy-decoded block; and (c) means for, responsive to determining that the mode is in the predetermined class, transposing at least a portion of the entropy-decoded block to obtain a transposed block.

Alternatively, memory 1520 may be an apparatus for encoding video on device 1500, the video including a picture partitioned into blocks. This apparatus comprises: (a) means for generating residual data for a current block, from spatial prediction of that block, using an intra-coding mode in a predetermined class; (b) means for spectrally transforming and quantizing the residual data to obtain a quantized transform block; (c) means for transposing at least a portion of the quantized transform block to obtain a transposed block; (d) means for level-run encoding the transform coefficients of the transposed block to obtain level-run pairs; and
(e) means for binarizing and entropy encoding the level-run pairs, using a context model.

Those of ordinary skilled in the art recognize that a variety of routine adaptations and modifications of the sample embodiments described hereinabove can be made while remaining within the scope of the present disclosure. Therefore, said embodiments should be considered to be illustrative and not restrictive.

What is claimed is:

1. A method for reconstructing a current block of residual data, using a video decoder, from an encoded block of residual data in a bitstream of encoded video, the method comprising:
   determining whether a mode used in generating the encoded block is an intra-prediction mode in a predetermined class;
   entropy decoding the encoded block to obtain an entropy-decoded block; and
   responsive to determining that the intra-prediction mode is in the predetermined class, transposing at least a portion of the entropy-decoded block to obtain a transposed block, and not performing said transposing if the mode is not in the predetermined class,
   wherein the predetermined class is a horizontal class.

2. The method of claim 1, wherein the horizontal class comprises angular intra-prediction modes numbered 0, 18, 19, 20, 21, 22, 23, 24 among 30 angular intra-prediction modes, wherein the 30 angular intra-prediction modes are numbered from 0 to 29 according to their corresponding angles of displacement from a current block to be coded to nearby pixels used in the intra-prediction, wherein the numbering increases with the angle of displacement in counterclockwise direction, and wherein respective angles of displacement of the 30 angular intra-prediction modes are evenly distributed in counterclockwise direction between +202.5 degrees and +60 degrees measured with respect to the positive horizontal axis, so that the angular intra-prediction mode with an angle of displacement of 0 degrees measured with respect to the positive horizontal axis is numbered 21.

3. The method of claim 1,
   wherein the current block consists of disjoint coefficient groups, each coefficient group comprising transform coefficients arranged in four rows; and
   wherein entropy decoding the encoded block comprises, for each coefficient group, decoding each bin corresponding to that coefficient group, based upon a context derived at least in part based upon whether that bin:
      corresponds to the DC transform coefficient in the top-left coefficient group, or otherwise
      corresponds to a transform coefficient in the top row,
      corresponds to a transform coefficient in the middle two rows, or
      corresponds to a transform coefficient in the bottom row.

4. The method claimed in claim 1, wherein entropy decoding comprises using a context model for modes in a class other than the predetermined class.

5. The method claimed in claim 1, wherein the at least a portion comprises a sub-block located on one of a left edge and a top edge of the entropy-decoded block.

6. The method claimed in claim 1, wherein the at least a portion is square.

7. The method claimed in claim 1, wherein the at least a portion comprises the entirety of the entropy-decoded block.

8. The method of claim 1, wherein determining that the mode is in the predetermined class comprises:
   decoding from the bitstream an indication of the mode; and
   determining to which class the mode belongs.

9. The method of claim 1, wherein determining that the mode is in the predetermined class precedes entropy decoding the encoded block.

10. The method of claim 1, further comprising:
    dequantizing the transposed block to obtain a dequantized block; and
    applying an inverse spectral transform to the dequantized block.

11. The method of claim 10, the wherein the inverse spectral transform is an inverse discrete cosine transform.

12. The method of claim 1,
    wherein the current block consists of three disjoint, transpose-invariant regions, each region partitioned into coefficient groups, each coefficient group comprising transform coefficients; and
    wherein entropy-decoding the encoded block comprises, for each coefficient group, decoding the (x,y)-position, in that coefficient group, of the last non-zero coefficient in a scan ordering of the coefficients in that coefficient group, based upon a context derived at least in part from the region to which the coefficient group belongs.

13. The method of claim 12,
    wherein the coefficient groups are arranged in rows and columns within the current block;
    wherein one of the three regions consists of the coefficient group in both the top row and the left column;
    wherein another of the three regions consists of the coefficient groups in either the top row or the left column, but not both; and
    wherein the remaining one of the three regions consists of the coefficient groups in neither the top row nor the left column.

14. A video decoder for reconstructing a current block of residual data, from an encoded block of residual data in a bitstream of encoded video, the decoder comprising:
    one or more processors;
    a memory; and
    a decoding application stored in memory and containing instructions for configuring the one or more processors to perform the method claimed in claim 1.

15. A non-transitory processor-readable medium storing processor-executable instructions for performing a method for reconstructing a current block of residual data, using a video decoder, from an encoded block of residual data in a bitstream of encoded video, the instructions, when executed, configuring one or more processors to:
    determine whether a mode used in generating the encoded block is an intra-prediction mode in a predetermined class;
    entropy decode the encoded block to obtain an entropy-decoded block;
    responsive to determining that the intra-prediction mode is in the predetermined class, transpose at least a portion of the entropy-decoded block to obtain a transposed block, and not perform said transposing if the mode is not in the predetermined class,
wherein the predetermined class is a horizontal class.

16. A method for encoding video using a video encoder, the video including a picture partitioned into blocks, the method comprising:

generating residual data for a current block, from spatial prediction of that block, using an intra-coding mode in a predetermined class;
spectrally transforming and quantizing the residual data to obtain a quantized transform block;
transposing at least a portion of the quantized transform block to obtain a transposed block;
level-run encoding the transform coefficients of the transposed block to obtain level-run pairs; and
binarizing and entropy encoding the level-run pairs, using a context model,
wherein the predetermined class is a horizontal class.

17. The method of claim 16, wherein the horizontal class comprises angular intra-prediction modes numbered 0, 18, 19, 20, 21, 22, 23, 24 among 30 angular intra-prediction modes, wherein the 30 angular intra-prediction modes are numbered from 0 to 29 according to their corresponding angles of displacement from a current block to be coded to nearby pixels used in the intra-prediction, wherein the numbering increases with the angle of displacement in counterclockwise direction, and wherein respective angles of displacement of the 30 angular intra-prediction modes are evenly distributed in counterclockwise direction between +202.5 degrees and +60 degrees measured with respect to the positive horizontal axis, so that the angular intra-prediction mode with an angle of displacement of 0 degrees measured with respect to the positive horizontal axis is numbered 21.

18. A video encoder for encoding video, the encoder comprising:
one or more processors;
a memory; and
an encoding application stored in memory and containing instructions for configuring the one or more processors to:
generate residual data for a current block, from spatial prediction of that block, using an intra-coding mode in a predetermined class;
spectrally transform and quantize the residual data to obtain a quantized transform block;
transpose at least a portion of the quantized transform block to obtain a transposed block;
level-run encode the transform coefficients of the transposed block to obtain level-run pairs; and
binarize and entropy encoding the level-run pairs, using a context model,
wherein the predetermined class is a horizontal class.

19. A non-transitory, processor-readable medium storing processor-executable instructions which, when executed, configures one or more processors to:
generate residual data for a current block, from spatial prediction of that block, using an intra-coding mode in a predetermined class;
spectrally transform and quantize the residual data to obtain a quantized transform block;
transpose at least a portion of the quantized transform block to obtain a transposed block;
level-run encode the transform coefficients of the transposed block to obtain level-run pairs; and
binarize and entropy encoding the level-run pairs, using a context model,
wherein the predetermined class is a horizontal class.

* * * * *